(12) United States Patent
Hakim et al.

(10) Patent No.: US 11,537,239 B1
(45) Date of Patent: Dec. 27, 2022

(54) DIFFUSION-BASED HANDEDNESS CLASSIFICATION FOR TOUCH-BASED INPUT

(71) Applicant: Microsoft Technology Licensing, LLC, Redmond, WA (US)

(72) Inventors: Adam Hakim, Tel Aviv (IL); Guy David Amir, Jerusalem (IL); Aviv Slobodkin, Ramat Gan (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/575,965

(22) Filed: Jan. 14, 2022

(51) Int. Cl.
*G06F 3/041* (2006.01)
*G06F 3/04883* (2022.01)

(52) U.S. Cl.
CPC ...... *G06F 3/04186* (2019.05); *G06F 3/04883* (2013.01)

(58) Field of Classification Search
CPC .......................... G06F 3/04186; G06F 3/04883
See application file for complete search history.

(56) References Cited

U.S. PATENT DOCUMENTS

| | | | |
|---|---|---|---|
| 7,701,442 B2 | 4/2010 | Wong et al. | |
| 8,665,238 B1 | 3/2014 | Gossweiler et al. | |
| 9,244,545 B2 | 1/2016 | Hinckley et al. | |
| 9,710,137 B2 | 7/2017 | Feng et al. | |
| 9,870,083 B2* | 1/2018 | Hinckley | G06F 3/04162 |
| 10,082,936 B1 | 9/2018 | Dillon et al. | |
| 10,678,381 B2 | 6/2020 | Mickelsen et al. | |
| 11,372,486 B1* | 6/2022 | Smolyanskaya | G06F 3/0482 |
| 2010/0289754 A1* | 11/2010 | Sleeman | G06F 3/04166 345/173 |
| 2010/0310136 A1 | 12/2010 | Tsuda | |

(Continued)

OTHER PUBLICATIONS

Bengio, et al., "Input-Output HMMs for Sequence Processing", In Journal of IEEE Transactions on Neural Networks, vol. 7, Issue 5, Sep. 1996, pp. 1231-1249.

(Continued)

*Primary Examiner* — Ibrahim A Khan
(74) *Attorney, Agent, or Firm* — Fiala & Weaver P.L.L.C.

(57) ABSTRACT

Methods, systems, apparatuses, and computer program products are provided herein for determining the handedness of input provided by a user via a touch interface. For instance, for each touch-based input detected, a score indicating a probability whether the touch-based input was inputted by a particular hand of the user is generated. A classification for the touch-based input is then generated based on a drift diffusion model-based technique in which inter-dependencies between a series of touch-based input are approximated. The determined classifications are aggregated and compared to threshold(s) to determine the handedness of the user. For example, if the aggregated classifications meet a first threshold, then a determination is made that touch-based input provided by a user was inputted by the user's left hand. If the aggregated classifications meet a second threshold, then a determination is made that touch-based input provided by the user was inputted by the user's right hand.

20 Claims, 10 Drawing Sheets

(56) References Cited

U.S. PATENT DOCUMENTS

| | | | |
|---|---|---|---|
| 2011/0102570 A1* | 5/2011 | Wilf | G06F 3/017 345/156 |
| 2012/0154313 A1* | 6/2012 | Au | G06F 3/04883 345/173 |
| 2012/0158629 A1* | 6/2012 | Hinckley | G06F 3/04186 345/173 |
| 2012/0262407 A1* | 10/2012 | Hinckley | G06F 3/04883 345/173 |
| 2012/0317521 A1* | 12/2012 | Ludwig | G06F 40/205 345/173 |
| 2013/0088434 A1* | 4/2013 | Masuda | G06F 3/0393 345/173 |
| 2013/0088465 A1* | 4/2013 | Geller | G06F 21/31 345/179 |
| 2013/0212535 A1* | 8/2013 | Kim | G06F 3/0484 715/841 |
| 2013/0321328 A1* | 12/2013 | Ahn | G06F 3/03549 345/174 |
| 2013/0328805 A1* | 12/2013 | Kim | G06F 3/0488 345/173 |
| 2014/0210797 A1* | 7/2014 | Kreek | G06F 3/0488 345/179 |
| 2014/0354589 A1* | 12/2014 | Ahn | G06F 3/0416 345/174 |
| 2014/0362002 A1* | 12/2014 | Nakasu | G06F 3/0416 345/173 |
| 2015/0002420 A1* | 1/2015 | Koh | G06F 3/03545 345/173 |
| 2015/0261373 A1* | 9/2015 | Smus | G06F 3/04883 345/174 |
| 2015/0301647 A1* | 10/2015 | Sato | G06F 3/044 345/174 |
| 2015/0309597 A1* | 10/2015 | Fujii | G06F 3/03545 345/173 |
| 2015/0347001 A1* | 12/2015 | Motoi | G06F 3/041 345/173 |
| 2015/0363034 A1* | 12/2015 | Hinckley | G06F 3/03545 345/173 |
| 2015/0363035 A1* | 12/2015 | Hinckley | G06F 3/04883 345/173 |
| 2016/0018960 A1* | 1/2016 | Feng | G06F 3/0412 715/762 |
| 2016/0026322 A1* | 1/2016 | Cho | G06F 3/0488 345/173 |
| 2016/0054851 A1* | 2/2016 | Kim | G06F 3/04847 345/174 |
| 2016/0077663 A1* | 3/2016 | Durojaiye | G06F 3/04186 345/173 |
| 2016/0124528 A1* | 5/2016 | Feng | G06F 3/03545 345/179 |
| 2016/0154474 A1* | 6/2016 | Park | G06F 3/0488 345/173 |
| 2016/0196002 A1* | 7/2016 | Kuge | G06F 3/04883 345/178 |
| 2016/0299606 A1* | 10/2016 | Go | G06F 3/04883 |
| 2018/0074637 A1* | 3/2018 | Rosenberg | G06F 3/03545 |
| 2018/0136822 A1* | 5/2018 | Seibert | G06F 3/04883 |
| 2019/0033994 A1* | 1/2019 | Kim | G06F 3/04166 |
| 2019/0064938 A1* | 2/2019 | Klein | G06F 3/04883 |
| 2019/0129558 A1* | 5/2019 | Yildiz | G06F 3/04883 |
| 2021/0072843 A1* | 3/2021 | Komatsu | G06F 3/04186 |
| 2021/0081104 A1* | 3/2021 | Chung | G06F 3/0304 |
| 2022/0269369 A1* | 8/2022 | Li | G06F 3/03545 |

OTHER PUBLICATIONS

Gomez, et al., "Pointing, Looking at, and Pressing Keys. A Diffusion Model Account of Response Modality", In Journal of HHS Author Manuscripts, Aug. 31, 2015, 21 Pages.

Leslie, et al., "Fast String Kernels using Inexact Matching for Protein Sequences", In Journal of Machine Learning Research, vol. 5, Issue, Nov. 1, 2004, pp. 1435-1455.

Leslie, et al., "The Spectrum Kernel: A String Kernel for SVM Protein Classification", In Publication of World Scientific, 2002, 12 Pages.

Li, et al., "A Robust Approach to Sequence Classification", In Proceedings of the 17th IEEE International Conference on Tools with Artificial Intelligence, Nov. 14, 2005, pp. 197-201.

Noh, et al., "Diffusion Decision Making for Adaptive k-Nearest Neighbor Classification", In Proceedings of Advances in Neural Information Processing Systems, vol. 25, 2012, pp. 1-9.

Pedersen, et al., "The Drift Diffusion Model as the Choice Rule in Reinforcement Learning", In Journal of Psychonomic Bulletin & Review, vol. 24, Issue 4, Dec. 13, 2016, pp. 1234-1251.

Shin, et al., "Handedness Detection Based on Drawing Patterns using Machine Learning Techniques", In Proceedings of the Thirteenth International Conference on Advances in Computer-Human Interactions, Jun. 22, 2020, 5 Pages.

Wei, et al., "Semi-Supervised Time Series Classification", In Proceedings of the 12th ACM SIGKDD International Conference on Knowledge Discovery and Data Mining, Aug. 20, 2006, pp. 748-753.

White, et al., "Using Diffusion Models to Understand Clinical Disorders", In Journal of Mathematical Psychology, vol. 54, Issue 1, Feb. 1, 2010, pp. 39-52.

* cited by examiner

DIFFUSION-BASED HANDEDNESS CLASSIFICATION FOR TOUCH-BASED INPUT

BACKGROUND

Touch interfaces are being increasingly used as a mean to provide input to computing systems due to their ease and versatility of operation. A touch interface can allow a user to perform various functions using a finger, stylus or other object at a location often dictated by a user interface being displayed via the touch interface. In general, the touch interface can recognize a touch event and the position of the touch event on the touch interface. The computing device can interpret the touch event and perform one or more actions based on the touch event.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, devices, and computer program products are provided herein for determining the handedness of touch-based input provided by a user using a contact instrument via a touch interface. For instance, for each touch-based input detected, a score indicating a probability whether the touch-based input was inputted by a particular hand of the user is generated. A classification for the touch-based input is then generated based on a drift diffusion model-based technique in which inter-dependencies between a series of touch-based input are approximated. The determined classifications are aggregated, and the aggregated classifications are compared to one or more predetermined thresholds to determine the handedness of the user. For example, if the aggregated classifications meet a first predetermined threshold, then a determination is made that touch-based input provided by a user was inputted by the user's left hand. If the aggregated classifications meet a second predetermined threshold, then a determination is made that touch-based input provided by the user was inputted by the user's right hand.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
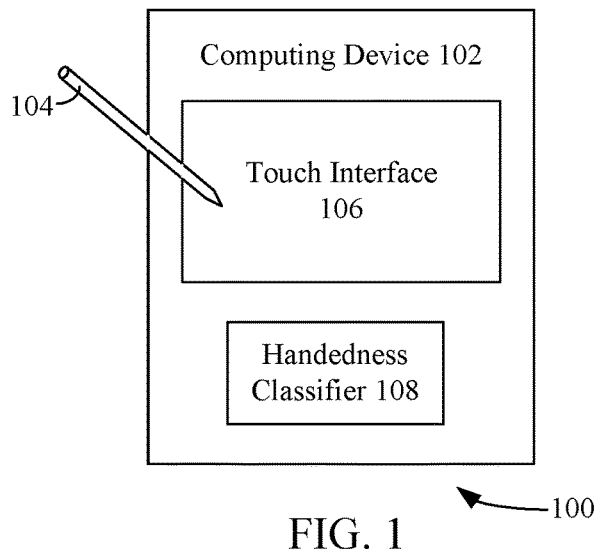
FIG. 1 shows a block diagram of a system for determining the handedness of input provided by a user via a touch interface in accordance with an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Determining the Handedness of Input Provided by a User Via a Touch Interface When a user applies a stylus to a touch interface, the location on the touch interface at which the stylus was applied can be determined based on capacitive properties of the touch interface. However, determining additional information about the user's interaction, such as the user's handedness for providing input via the touch interface, is difficult. While machine learning models are increasingly being used to solve more difficult problems, machine learning models are generally incapable of properly solving problems involving a sequence of inputs having an unknown dependency therebetween, as is the case with inputs provided by a stylus, where the inputs are time-dependent and depend on the handedness of the user. Machine learning models have difficulty solving this problem because they assume the sequence's inputs are either independent and identically distributed, which is inaccurate and damaging in many cases, or totally dependent. Some Bayesian methods are suitable for estimating inter-dependencies between samples of a series, but these methods are incapable of predicting on complex multivariate sequences.

The embodiments described herein solve the problem of classifying a sequence (e.g., a series of touch-based inputs) with a single constant binary label (e.g., "left-handed" or "right-handed"), while the sequence's inputs are inter-dependent, with some unknown conditional probability. Additionally, the techniques described herein solve a sequence classification problem in which each sample (e.g., each touch-based input) of the sequence is considered separately towards a final classification of the entire sequence. In sequential supervised learning problems, each observation includes a sequence of inputs and corresponding labels per input, whereas the problem solved by the techniques disclosed herein solve a stricter version, where all inputs of a sequence share the same label. Conversely, in sequence classification problems, conventional methods do have the desirable outcome, namely a single label per sequence. However, they do not enable prediction on each input of the sequence separately, which is critical to this problem setting. The techniques described herein, however, advantageously solve a sequence classification problem, while treating it as a sequential learning problem by accumulating evidence from each input of the sequence separately.

In particular, the embodiments described herein are directed to determining the handedness of touch-based input provided by a user using a contact instrument via a touch interface. For instance, for each touch-based input detected, a score indicating a probability whether the touch-based input was inputted by a particular hand of the user is generated. A classification for the touch-based input is then generated based on a drift diffusion model-based technique in which inter-dependencies between a series of touch-based input are approximated. The determined classifications are aggregated, and the aggregated classifications are compared to one or more predetermined thresholds to determine the handedness of the user. For example, if the aggregated classifications meet a first predetermined threshold, then a determination is made that touch-based input provided by a user was inputted by the user's left hand. If the aggregated classifications meet a second predetermined threshold, then a determination is made that touch-based input provided by the user was inputted by the user's right hand.

In accordance with the embodiment described herein, a source (i.e., a user) is classified once a threshold for a class (e.g., "left-handed" or "right-handed") is reached. Otherwise, the source remains unclassified. Thus, the modeling of the dependencies between different instances of touch-based input may be bypassed, which is not possible utilizing conventional machine learning models. This allows a black box prediction of the constant label (or class) matching a touch-based input sequence of any length.

The techniques described herein improve the functioning of a computing device on which the classification is performed. For example, it has been observed that accurate classifications of the handedness of a user may be determined utilizing a relatively small amount of touch-based input (e.g., ranging between 25-200 touch-based input samples). Conventional techniques typically require thousands of samples. Accordingly, the techniques described herein process a smaller number of samples, thereby conserving resources (e.g., processing cycles, memory, storage, input/output (I/O) transactions, power, etc.) of the computing devices.

In addition, the techniques described herein provide improvements to a graphical user interface. For instance, as described below, once the handedness of a user is determined, various graphical user interface elements may be displayed such that graphical user interface elements are unobscured by the particular hand of the user by which the hard press was provided. Moreover, touch-based input received via a portion of the user's hand (e.g., the user's palm) that is applied to a touch interface while providing input via a contact instrument, such as a stylus, is rejected. This advantageously prevents unintended touch-based input from activating unintended functionality or causing unwanted marks.

Systems and devices may be configured in various ways for determining the handedness of input provided by a user via a touch interface. For instance, FIG. 1 is a block diagram of a system 100 for determining the handedness of input provided by a user via a touch interface in accordance with an example embodiment. As shown in FIG. 1, system 100 comprises a computing device 102 and a contact instrument 104. Computing device 102 comprises a touch interface 106 and a handedness classifier 108. Touch interface 106 may comprise a touch screen or display (e.g., a capacitive touch screen), a touch pad, and/or any interface configured to detect the conductive touch of a human finger or contact instrument 104. Examples of contact instrument 104 include, but are not limited to, a stylus, a digital pen, a light pen, and/or the like. Computing device 102 may be any type of computing device or computing system, including a terminal, a personal computer, a laptop computer, a tablet device, a smart phone, a personal digital assistant, a game console or gaming device, a television, and/or the like that comprise a touch interface (e.g., touch interface 106) and may be utilized by users through interaction with contact instruments (e.g., contact instrument 104).

Handedness classifier 108 is configured to determine the handedness of touch-based input provided by a user. Examples of touch-based input include, but are not limited to, input provided to touch interface 106 via a human's hand (e.g., finger, palm, etc.) or contact instrument 104. For example, handedness classifier 108 is configured to determine whether a user provided input using the user's left hand or right hand. Handedness classifier 108 may be configured to utilize a drift diffusion model-based technique to determine the handedness, as described below with reference to FIG. 2. For any given touch-based input (also referred herein as a "frame") detected by touch interface 106, a score may be generated that indicates a probability whether the detected input was inputted by a particular hand of a user. A classification is generated as to whether the input was provided by either the left hand or the right hand of the user based on the score. As additional touch-based input is detected (i.e., as the user places or moves contact instrument 104 to other portions of touch interface 106, for example, while entering handwriting strokes, etc.), the generated classifications are accumulated until the accumulated classification meets a particular threshold of a plurality of thresholds. Handedness classifier 108 determines that the detected touch-based inputs were provided using the user's left hand responsive to determining that the accumulated classifications meet a first threshold and determines that the detected touch-based inputs were provided using the user's right hand responsive to determining that the accumulated classifications meet a second threshold. Handedness classifier 108 may be a part of an operating system (OS) installed on computing device 102 or an application installed on computing device 102, or, may be an application itself, etc., in various embodiments.

Upon determining the hand by which the user provided touch-based input, one or more settings of an operating system and/or an application executing on computing device 102 may be updated, which cause the operating system and/or application to display a graphical user interface (GUI) element in accordance with the determined hand. For instance, after the user input's handedness has been determined, the user may provide subsequent touch-based input by applying contact instrument 104 to touch interface 106. In a particular example, the user may provide a "hard press," where the user presses contact instrument 104 on touch interface 106 for a particular time period and/or at a particular pressure. In another embodiment, computing device 102 may receive a signal from contact instrument 204 that indicates that a GUI element is to be displayed via touch interface 106. For instance, contact instrument 104 may comprise a button that, when activated, causes contact instrument 104 to send a signal to computing device 102. Responsive to detecting such touch-based input or such a signal, the operating system or application may cause a GUI element (e.g., a menu) to be displayed such that the GUI element is unobscured by the particular hand of the user holding contact instrument 104 and/or by which the hard press was provided. The operating system or application may also reject touch-based input received via a portion of the user's hand (e.g., the user's palm) that is applied to touch interface 106 (referred herein as a "touch blob") while touch-based input via contact instrument 104 is detected. This advantageously enables a user to rest his or her hand naturally on touch interface 106 while providing touch-based input via contact instrument 104 without having to worry about providing unintended touch-based input, which may cause unwanted marks and/or activate unintended functionality.

Figure 2:
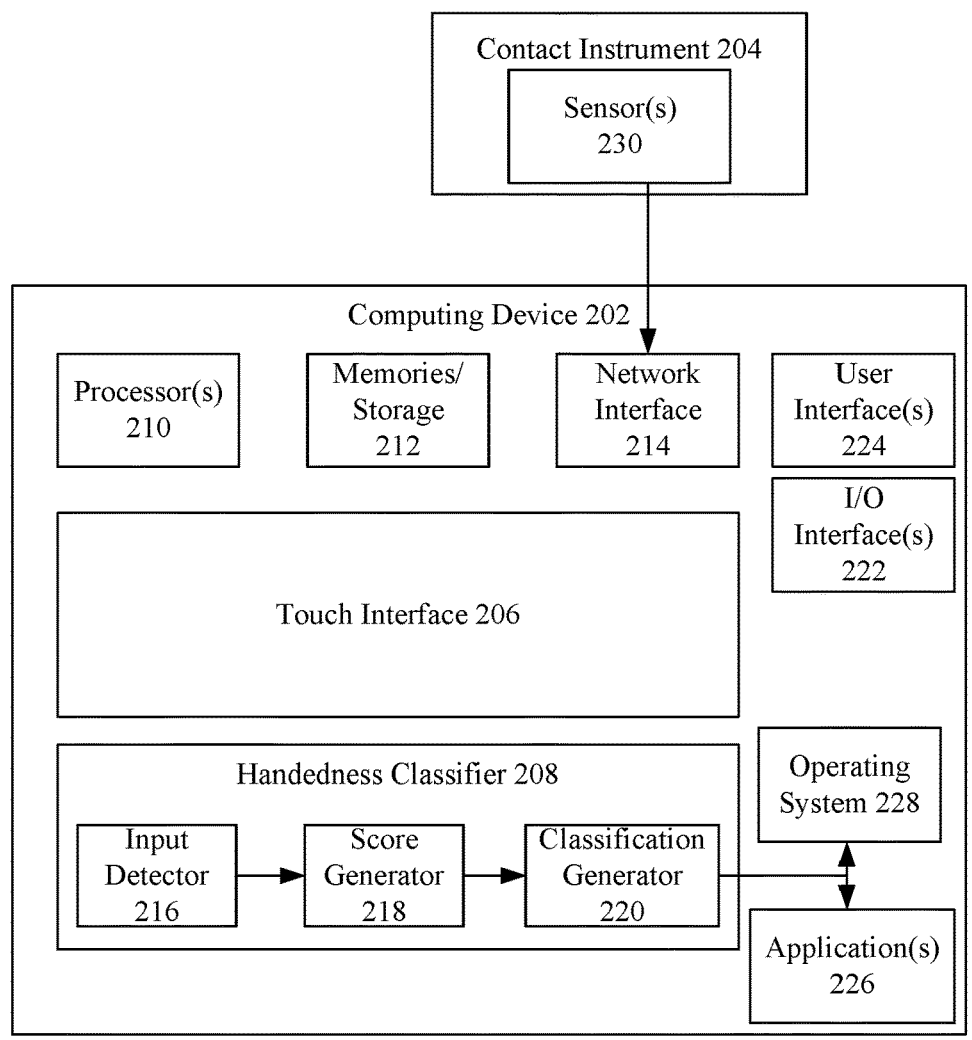
FIG. 2 depicts a block diagram of a system configured to determine the handedness of input provided by a user via a touch interface in accordance with another example embodiment.

FIG. 2 depicts a block diagram of a system 200 configured to determine the handedness of input provided by a user via a touch interface in accordance with another example embodiment. As shown in FIG. 2, system 200 comprises a computing device 202 and a contact instrument 204. Computing device 202 and contact instrument 204 are examples of computing device 102 and contact instrument 104, as described above with reference to FIG. 1.

As shown in FIG. 2, computing device 202 may include one or more of a processor ("processor") 210, one or more of a memory and/or other physical storage device ("memory") 212, one or more network interfaces ("network interface") 214, and a handedness classifier 208, which is an example of handedness classifier 108, as described above with reference to FIG. 1. System 200 may also include an input/output interface(s) 222, and one or more user interfaces (UI(s)) 224. System 200 may also include additional components (not shown for brevity and illustrative clarity) including, but not limited to, components and subcomponents of other devices and/or systems herein, as well as those described below with respect to FIGS. 12 and 13, such as an operating system.

Processor 210 and memory 212 may respectively be any type of processor circuit and memory that is described herein, and/or as would be understood by a person of skill in the relevant art(s) having the benefit of this disclosure. Processor 210 and memory 212 may each respectively comprise one or more processors or memories, different types of processors or memories, remote processors or memories, and/or distributed processors or memories. Processor 210 comprises circuitry that is configured to execute computer program instructions such as but not limited to embodiments of handedness classifier 208, which may be implemented as computer program instructions for determining the hand by which input was provided, for example, via touch interface 206, etc., as described herein. Memory 206 is configured to store such computer program instructions/code, as well as to store other information and data described in this disclosure including, without limitation, characteristics of contact instrument 204, scores, classifications, etc.

Network interface 214 may be any type or number of wired and/or wireless network adapter, modem, etc., configured to enable computing device 202 to communicate with other devices over a network, such as communications between computing device 202 and other devices utilized in a network as described herein over a network. Examples of a network include, but are not limited to, the Internet, wired or wireless networks and portions thereof, point-to-point connections, local area networks, enterprise networks, and/or the like.

I/O interface(s) 222 may comprise hardware and/or software and may support any number of input devices and instruments such as a mouse, a microphone, a camera, a kinetic sensor, a physical keyboard, a trackball, virtual reality eyewear, gloves, other wearables or sensors, etc., and/or the like, and one or more output devices such as a speaker, a display screen, and/or the like. Additional I/O devices supported by I/O interface(s) 222 are described below with respect to FIGS. 12 and 13.

UI(s) 224 may include, without limitation, any type of software or hardware UI implementation. UI(s) 224 may be, for example, user interfaces displayed to users via output devices described herein that may be interacted with via input devices described herein. UI(s) 224 may comprise portions of any types of software applications (e.g., applications(s) 226 and/or operating systems (e.g., operating system 228). Examples of application(s) 226, include, but are not limited to, web browsers, productivity software, electronic mail applications, audio applications, video applications, audio/video applications, 3-D software/virtual environments, drawing software, etc. UI(s) 224 may display content or representations thereof, as described herein, such as any type of selectable object including, without limitation, typed characters, handwritten characters, images, photographs, diagrams, cells in a grid, audio data, video data, virtual environment/3-D constructs, graphs, and/or the like. Application(s) 226 and operating system 228 may be stored in memory 206 and executed by processor 204.

Handedness classifier 208 includes a plurality of components for performing the functions and operations described herein. As shown, handedness classifier 208 includes an input detector 216, a score generator 218, and a classification generator 220. While shown separately for illustrative clarity, in embodiments, one or more of input detector 216, score generator 218, and classification generator 220 may be combined together and/or as a part of other components of computing device 202. In some embodiments, less than all of the components of handedness classifier 208 illustrated in FIG. 2 may be included. In software implementations, one or more components of input detector 216, score generator 218, and classification generator 220 may be stored in memory 206 and are executed by processor 204.

Input detector 216 may be configured to receive inputs generated by interaction with contact instrument 204 via touch interface 206. Input detector 210 may be configured to determine characterization information or characteristics of the contact instrument interaction with touch interface 106. Examples of characteristics include, but are not limited to, a location of touch interface 206 at which the touch-based input was applied by contact instrument 204, a tilt angle of contact instrument 204 with respect to touch interface 206, and an azimuth (or azimuth angle) of contact instrument 204. To determine the location of touch interface 206 at which the touch-based input was applied by contact instrument, input detector 216 may determine the X and Y coordinates of touch interface 206 to which contact instrument 204 is applied and the touch-based input is detected. A combination of one or more of these characteristics provide some type of indication as to which hand has provided input via contact instrument 204. For instance, left-handed users tend to hold contact instrument 204 such that it has a first tilt angle and azimuth (e.g., contact instrument 204 points downwards towards touch interface 206 and to the right (i.e., away) from the left hand), and right-handed users tend to hold contact instrument 204 such that it has a second tilt angle and azimuth (e.g., contact instrument 204 points downwards towards touch interface 206 and to the left (i.e., away) from the right hand).

One or more of the characteristics described above may be determined, at least in part, by contact instrument 204. For instance, contact instrument 204 may comprise one or more sensors 230 configured to collect data for determining the orientation (e.g., the tilt angle and azimuth) of contact instrument 206 relative to a reference point of touch interface 206. Examples of sensor(s) 230 include, but are not limited to, a gyroscope, an accelerometer, a magnetometer, etc. Such information may be provided to computing device 202, for example, via network interface 214. Using the characteristics provided by sensor(s) 230 and/or the characteristics determined by input detector 216, input detector 216 may determine the orientation of contact instrument 204 relative to the orientation of touch interface 206.

Figure 3:
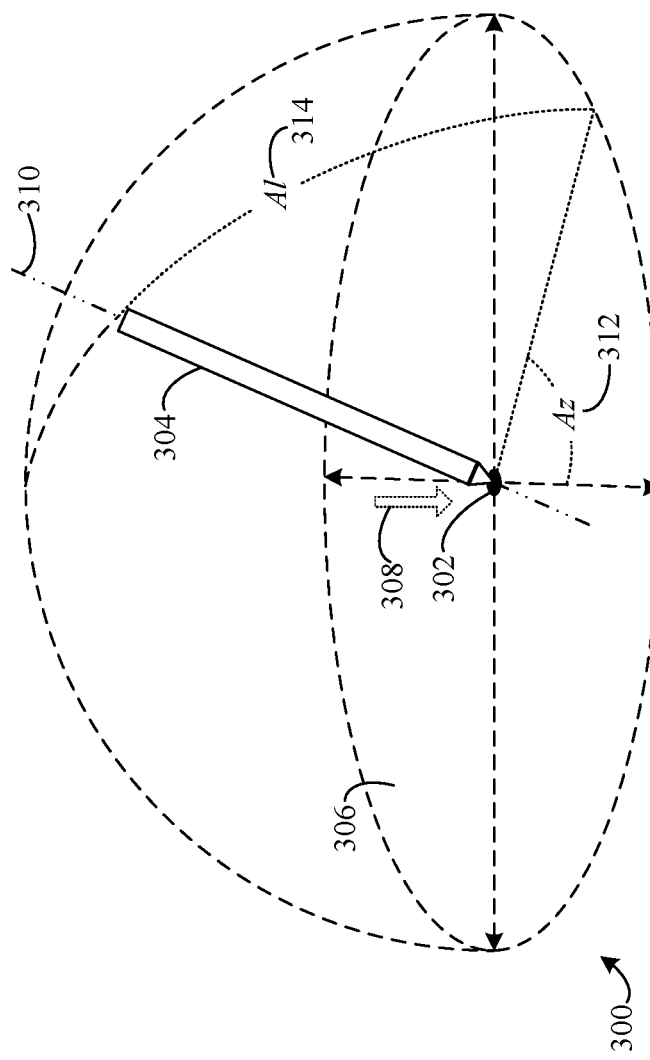
FIG. 3 shows a diagram for characteristics utilized to determine the orientation of a contact instrument in accordance with an example embodiment.

For example, FIG. 3 shows a diagram 300 for characteristics utilized to determine the orientation of a contact instrument in accordance with an example embodiment. The characteristics are described with respect to a stylus 304 being used by a user and that is interacting with a touch screen 306. Stylus 304 is an example of contact instrument 204, and touch screen 306 is an example of touch interface 206, as respectively described above with reference to FIG. 2. As shown in FIG. 3, stylus 304 may interact with touch screen 306 at a location 302. While characteristics are described with respect to a stylus 304 interacting with a touch screen 306 for illustrative purposes, any other type of contact instrument and/or touch interface are also contemplated herein.

Interactions may include a pressure 308 (or force) applied to touch screen 306 by the user via stylus 304. Pressure 308 may vary in a way corresponding to different portions of content the user desires to interact with. For instance, a user may press harder with more pressure 308 through stylus 304 on touch screen 306 to perform a first action, or conversely, may apply less pressure 308 to perform a second action. These interactions through pressures applied, and changes thereof, described here may be determined and/or identified by input detector 216 of handedness classifier 208 in FIG. 2.

Also illustrated for characteristics 300 is an orientation of stylus 302 along an axis 310 with respect to touch screen 306. Axis 310 runs along the length of stylus 304 and through location 302. Axis 310 may be further defined by an azimuth angle (Az) 312 and a longitudinal (or tilt) angle (Al) 314. It should be noted that the reference point shown for determining the values of Az 312 and Al 314 with respect to touch screen 306 are illustrative only, and are not to be considered limiting. Any reference point of touch screen 306 may be used for determining orientations, according to embodiments.

Orientations may be changed by altering one or more of Az 312 and Al 314 though interactions of stylus 304. In embodiments, a given orientation of stylus 304, e.g., a smaller value of Al, may cause more or less of the contacting portion thereof to interact with touch screen 306. Similarly, changes in Az may cause the contacting portion of stylus 304 to interact with a different area of touch screen 306. These differences in interactions through orientations, or changes thereof, described herein may be determined and/or identified by input detector 216 of system 200 in FIG. 2. For instance, upon detecting a touch-based input applied by stylus 304, input determiner 216 may utilize the characteristics provided by stylus 304 to determine the orientation of stylus 304. Alternatively, stylus 304 may be configured to determine its own orientation utilizing sensor(s) 230 and provide the determined orientation to input detector 216 via network interface 214.

Referring again to FIG. 2, input detector 216 may be further configured to determine a location of the touch interface at which a touch blob was detected by the touch interface, the touch blob corresponding to a portion of the particular hand of the user that is applied to touch interface 206 while the touch-based input from contact instrument 204 is received. Utilizing this location along with the location at which the touch-based input from contact instrument 204 is received (as described above), input detector 216 may determine an angle at which contact instrument 204 is positioned with respect to the first location and the second location.

Figure 4B:
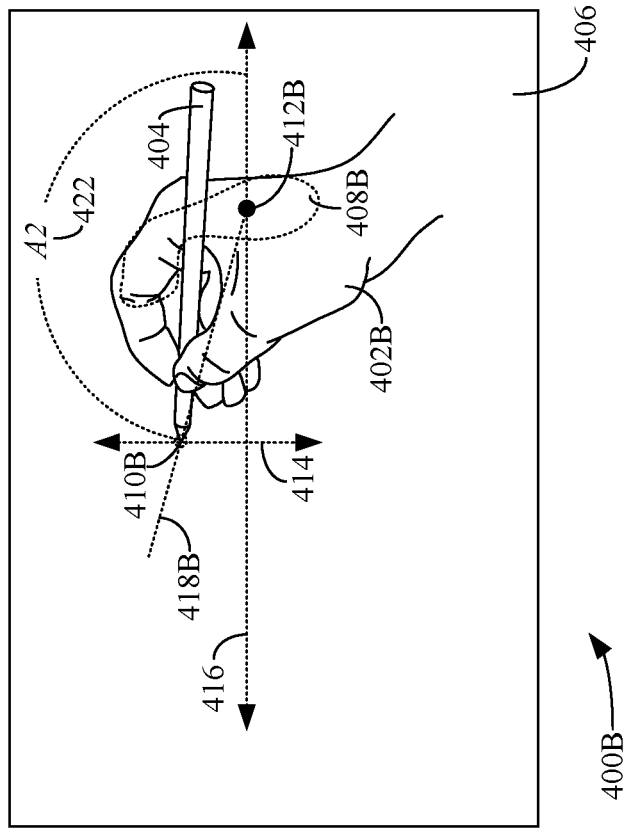
FIGS. 4A and 4B depict illustrations in which both a touch-based input from a contact instrument and a touch blob is detected in accordance with an example embodiment.
Figure 4A:
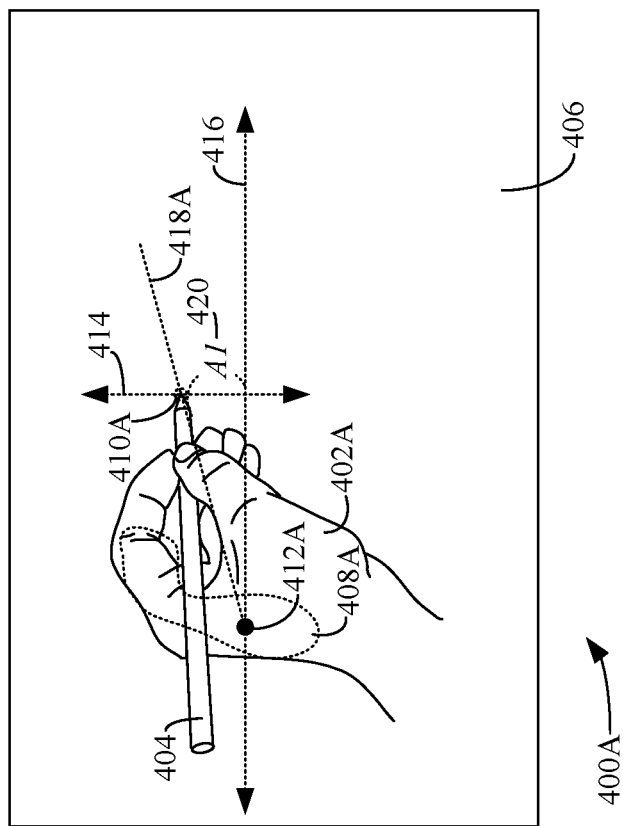

For instance, FIGS. 4A and 4B depict illustrations 400A and 400B in which both a touch-based input from a contact instrument and a touch blob is detected in accordance with an example embodiment. In particular, FIG. 4A depicts a touch-based input provided via a user's left hand, and FIG. 4B depicts a touch-based input provided via a user's right hand. As shown in FIG. 4A, the user holds contact instrument 404 using the user's left hand 402A and provides a touch-based input by applying contact instrument 404 to a touch interface 406. Contact instrument 404 and touch interface 406 are examples of contact instrument 204 and touch interface 206, as respectively described above with reference to FIG. 2. When applying the touch-based input via contact instrument 406, the user rests his or her hand on touch interface 406, thereby causing a portion of the user's hand to come into contact with touch interface 406. The portion of the user's hand detected by input detector 216 is shown as touch blob 408A. The location at which contact instrument 404 provides a touch-based input via touch interface 406 is shown as location 410A.

Input determiner 216 may determine a centroid 412A (or center of mass) of touch blob 408A, which is representative of the location of touch blob 408. Centroid 412A may be determined utilizing various techniques that are known to those of ordinary skill in the art. For instance, centroid 412A may be determined by determining the arithmetic mean position of all the detected X and Y coordinates of touch interface 206 corresponding to touch blob 408A.

To determine the angle at which contact instrument 404 is positioned with respect to the location of touch blob 408A, input determiner 216 may determine a longitudinal axis 414 of touch interface 406 that intersects with location 410A and/or determine a latitudinal axis 416 of touch interface 406 that intersects with centroid 412A. Input determiner 216 may also determine a line 418A that intersects both location 410A and centroid 412A. Using various geometric theorems known to those of ordinary skill in the art, input determiner 216 may determine an angle A1 420 that represents the angle at which contact instrument 404 is positioned with respect to centroid 412A utilizing one or more of longitudinal axis 414, latitudinal axis 416, and/or line 418A. As shown in FIG. 4B, angle A is approximately 25 degrees. In the example shown in FIG. 4B, such an angle may be representative of a user holding contact instrument 404 with his or her left hand. It is noted that input determiner 216 may utilize other techniques that are known to those of ordinary skill in the art to determine angle A1 420.

As shown in FIG. 4B, the user holds contact instrument 404 using the user's right hand 402B and provides a touch-based input by applying contact instrument 404 to a touch interface 406. When applying the touch-based input via contact instrument 406, the user rests his or her hand on touch interface 406, thereby causing a portion of the user's hand to come into contact with touch interface 406. The portion of the user's hand detected by input detector 216 is shown as touch blob 408B. The location at which contact instrument 404 provides a touch-based input via touch interface 406 is shown as location 410B.

Input determiner 216 may determine a centroid 412B (or center of mass) of touch blob 408B, which is representative of the location of touch blob 408, in a similar manner as described above with reference to FIG. 4A.

To determine the angle at which contact instrument 404 is positioned with respect to the location of touch blob 408B, input determiner 216 may determine a longitudinal axis 414 of touch interface 406 that intersects with location 410B and/or determine a latitudinal axis 416 of touch interface 406 that intersects with centroid 412B. Input determiner 216 may also determine a line 418B that intersects both location 410B and centroid 412B. Using various geometric theorems known to those of ordinary skill in the art, input determiner 216 may determine an angle A2 422 that represents the angle at which contact instrument 404 is positioned with respect to centroid 412B utilizing one or more of longitudinal axis 414, latitudinal axis 416, and/or line 418B. As shown in FIG. 4B, angle A is approximately 155 degrees. In the example shown in FIG. 4B, such an angle may be representative of a user holding contact instrument 404 with his or her right hand. It is noted that input determiner 216 may utilize other techniques that are known to those of ordinary skill in the art to determine angle A2 422.

Accordingly, the location of touch interface 206 at which touch-based input is applied by contact instrument 204, and the location at which the touch blob is detected by touch interface 206 may also be indicative as to which hand provided input via contact instrument 204. For instance, as described above, utilizing these locations, an angle at which contact instrument 204 is positioned with respect to these locations is determined. The determined angle is indicative of the hand utilized to provide touch-based input via contact instrument 204.

Referring again to FIG. 2, each of the characteristics of contact instrument 204 determined for each detected touch-based input (or frame) may be provided to score generator 218 by input detector 216. Score generator 218 is configured to generate a score indicating a probability whether the touch-based input was inputted by a particular hand (i.e., either the left hand or the right hand) of the user. In accordance with an embodiment, score generator 218 comprises a machine learning model (e.g., a supervised machine learning model, an unsupervised machine learning model, a semi-supervised machine learning model, etc.) configured to output the score based on the characteristics. In accordance with such an embodiment, each of the characteristics of the touch-based input is a particular feature. The features are featurized into a feature vector. The feature vector may take any form, such as a numerical, visual, and/or textual representation, or may comprise any other suitable form. The machine learning model is configured to generate the score for the touch-based input based on the feature vector. Each generated score may comprise a value between 0.0 and 1.0, where higher the number, the greater the probability that the touch-based input was inputted from a particular hand of the user. For instance, in accordance with an embodiment, the closer the value is to 1.0, the greater the probability that the touch-based input was inputted from the left hand of the user. The closer the value is to 0.0, the greater the probability that the touch-based input was inputted from the right hand of the user. In accordance with another embodiment, the closer the value is to 1.0, the greater the probability that the touch-based input was inputted from the right hand of the user. The closer the value is to 0.0, the greater the probability that the touch-based input was inputted from the left hand of the user. The score generated for each detected touch-based input is provided to classification generator 220.

Classification generator 220 is configured to generate a final classification as to whether touch-based input provided by a user is inputted from either the user's left hand or the right hand. Classification generator 220 may generate a classification for each score provided thereto (i.e., each score generated for touch-based input that was detected) and aggregate the classifications. Classification generator 220 may determine whether the aggregated classifications meet one of a plurality of different predetermined thresholds. In accordance with an embodiment, if the aggregated classifications meet a first predetermined threshold, then classification generator 220 determines that touch-based input provided by a user was inputted by the user's left hand. If the aggregated classifications meet a second predetermined threshold, then classification generator 220 determines that touch-based input provided by a user was inputted by the user's right hand.

Classification generator 220 may utilize a drift diffusion model-based technique to generate each classification, where the following holds true: a finite sequence of frames (or touch-based input) from a user's handwriting movements are eventually classified as either from being from the user's left hand or the user's right hand; the source (S) of the sequence is the user; the sequence $x_1, \ldots, x_t$ consists of the user's recorded handwriting frames in T consecutive time-points; the two binary labels are "left" or "right", respectively corresponding to a value of 1 and −1; each single frame $x_t$ can be weakly classified as either being inputted from the user's left hand or the user's right hand, based solely on itself, using a function estimated by a machine learning model (i.e., the machine learning model of classification generator 220); and the sequence of frames $(x_1, \ldots, x_t)$ are time-dependent, and depend on the handedness of each user classified.

In accordance with the drift diffusion model, the aggregated classification may be generated by classification generator 220 in accordance with Equation 1, which is shown below:

$$S_t = S_{t-1} + d(v_a - v_b) + \in \quad \text{(Equation 1)}$$

where $S_t$ represents the aggregated (or accumulated) classification generated for frame (or at timepoint) t (or most recent touch-based input detected), $S_{t-1}$ represents the aggregated (or accumulated) classification generated for a previous frame (or previous timepoint) t−1 (or the last touch-based input detected), d represents a diffusion rate representative of a dependency (e.g., a time dependency and handedness of the user) between the present frame and the previous frame, $v_a$ represents the score generated by score generator 218 for the present frame (or the probability that the present frame was inputted by a particular hand of the user), $v_b$ represents one minus the score generated by score generator 218 for the present frame (or the probability that the present frame was inputted by the other hand of the user), and E represents noise.

The diffusion rate signifies the fluidity of past choices. While the diffusion rate can be set to any value depending on the application in which classification is performed, the diffusion rate should be set to a value that empirically achieves the ideal classification results. The diffusion rate may represent a hyperparameter utilized to control the learning process of the machine learning model of classification generator 220 (also referred to the learning rate). The diffusion rate can be adjusted for improved classifications on the training data utilized to train the machine learning model of classification generator 220, and the classification results can be measured on a separate test dataset. Adjusting the diffusion rate using the training data essentially approximates the degree of inter-dependency between inputs (or frames) by estimating the amount of new evidence in each input and how much each input should contribute to the accumulated prediction.

It has been observed that a diffusion rate value of 0.05 results in ideal classification results, where touch-based input provided by left-handed users was indeed classified as being provided from the left hand the majority of the time, and where touch-based input provided by right-handed users was indeed classified as being provided from the right hand the majority of the time. Some users fluctuated between the left-hand and right-hand thresholds and remained there at the conclusion of their frames, resulting in no classification. The value set for the diffusion rate causes the performance to vary. For instance, it has been observed that a diffusion rate value of 0.02 increased the number of correct classifications, decreased the number of incorrect classifications, but increased the number of outliers (i.e., users that were not able to be classified). This flexibility in the model is very useful, and it allows practitioners to adjust the algorithm to whatever best suits their ask and product requirements. If the foremost requirement is to reduce errors, even at the cost of no classification, then a lower diffusion rate can be set.

The noise E may be a randomly-generated value for any given frame. The value selected for noise E may be sampled randomly from a normal distribution, a Gaussian distribution, etc. In certain scenarios, it may be desired to select a value for noise E that makes it more difficult for a particular threshold to be reached. This is particularly useful in a situation in which classifications generated by classification generator 220 are found to be prone to error. This reduces the likelihood that classification generator 220 generates inaccurate classifications.

In accordance with Equation 1, a source (or user) is classified once a threshold for a class (e.g., either left-handed or right-handed) is met, otherwise the source remains unclassified. Thus, the modeling of the dependencies between different instances of the series may be bypassed, thereby allowing a "black box" prediction of the label matching a sequence of any length.

The intuition behind Equation 1 is that each touch-based input (or frame) has a small and accumulating weight towards the final prediction for the source (i.e., the user). Thus, if there is a sequence of similar frame predictions, then the accumulated weight should dominate the noise E and heighten the total score $S_t$ above a predetermined threshold, which in turn would grant the sequence with a constant single label. On the other hand, differing (high variance) frames would yield inconsistent predictions between consecutive inputs, thus causing the noise E to dominate the diffusion drift, and lowering the accumulated score below the thresholds of each class, effectively labeling the sequence with high uncertainty. In accordance with an embodiment, the machine learning model may produce a useful function, where, if a sequence does not accumulate a prediction that meets a given threshold, no classification is made, and thus more errors may be averted.

The following describes an example scenario for classifying the handedness of a user. In this example, a first threshold indicative of a user inputting touch-based input with his or her left hand is set to the value of 1, and a second threshold indicative of a user inputting touch-based input with his or her right hand is set to the value of −1. It is noted that these threshold values are purely exemplary and that other threshold values may be utilized and/or may be set statically or dynamically (e.g., on a per-user basis). Suppose a user begins writing text using contact instrument 204 and touch interface 206. Input detector 216 detects the initial touch-based input provided by the user and determines characteristics of the touch-based input. Score generator 218 may featurize the characteristics into a feature vector and provide the feature vector as an input to a machine learning model, which outputs a score $v_a$ for the touch-based input. Suppose the score is 0.75. The score is provided to classification generator 220. Classification generator 220 may determine $v_b$ by subtracting $v_a$ from the value 1, thereby resulting in a $v_b$ value of 0.25. Because this is the first detected touch-based input, the value of $S_{t-1}$ is set to 0, as there are no past classifications. Further suppose that the value of d is set to 0.03 and the value of ∈ is 0.4. In this example, the value of $S_t$ is equal to 0.415 (i.e., 0+0.03(0.75−0.25)+0.4). Classification generator 220 determines whether the value of $S_t$ meets either the first threshold (e.g., reaches or exceeds the value of 1) or the second threshold (reaches or falls below the value of −1). In this case, the value of $S_t$ fails to meet either threshold, and thus, no classification is generated by classification generator 220.

Next, the user moves contact instrument 204 to another location of touch interface 206, thereby providing a second touch-based input. Input detector 216 detects the second touch-based input provided by the user and determines characteristics of the second touch-based input. Score generator 218 may featurize the characteristics into a feature vector and provide the feature vector as an input to a machine learning model, which outputs a score $v_a$ for the touch-based input. Suppose the score is 0.85. The score is provided to classification generator 220. Classification generator 220 may determine $v_b$ by subtracting $v_a$ from the value 1, thereby resulting in a $v_b$ value of 0.15. The value of $S_{t-1}$ is equal to 0.415, as described above, and the value of d and E remain 0.03 and 0.4, respectively. The value of $S_t$ determined for the second touch-based input is equal to 0.836 (i.e., 0.415+0.03(0.85-0.15)+0.4). Classification generator 220 determines whether the value of $S_t$ meets either the first threshold (e.g., reaches or exceeds the value of 1) or the second threshold (reaches or falls below the value of −1). In this case, the value of $S_t$ fails to meet either threshold, and thus, no classification is generated by classification generator 220. The foregoing process continues until the value of $S_t$ meets one of the first threshold or second threshold.

Once a particular threshold is met, handedness classifier 208 may provide a command to one or more of operating system 228 and applications(s) 226 that causes operating system 228 and applications(s) 226 to change a configuration setting thereof. For instance, the configuration setting may indicate whether the user is a left-handed user or a right-handed user. Based on the configuration setting, operating system 228 and/or applications(s) 226 may display a graphical user interface (GUI) element in accordance with the determined hand. For instance, after the user input's handedness has been determined, the user may provide subsequent input by applying contact instrument 204 to touch interface 206, such as a "hard press." Alternatively, the user may press a button included on contact instrument 204 that, when activated, causes contact instrument 204 to provide a signal to computing device 202 (e.g., via network interface 214). Responsive to input detector 216 detecting such input, operating system 228 and/or applications(s) 226 may cause a GUI element (e.g., a menu) to be displayed such that GUI element is unobscured by the particular hand of the user holding contact instrument 204 and/or by which the hard press was provided. Operating system 228 and/or applications(s) 226 application may also reject a detected touch blob while input via contact instrument 204 is detected.

It is noted that while the embodiments described above with reference to FIG. 2 are directed to determine the handedness of user input, the embodiments described herein are not so limited. For instance, the techniques described herein may be utilized to classify other types of entities, such as, but not limited to, an object present in a series of video frames. For example, each video frame in the series may be provided to score generator 218, which generates a score for each video frame in a similar manner as described above with respect to touch-based input. Classification generator 220 may be configured to generate a classification for the object in accordance with Equation 1 described above by aggregating the classifications generated for the object from each video frame in the series of video frames.

Figure 5:
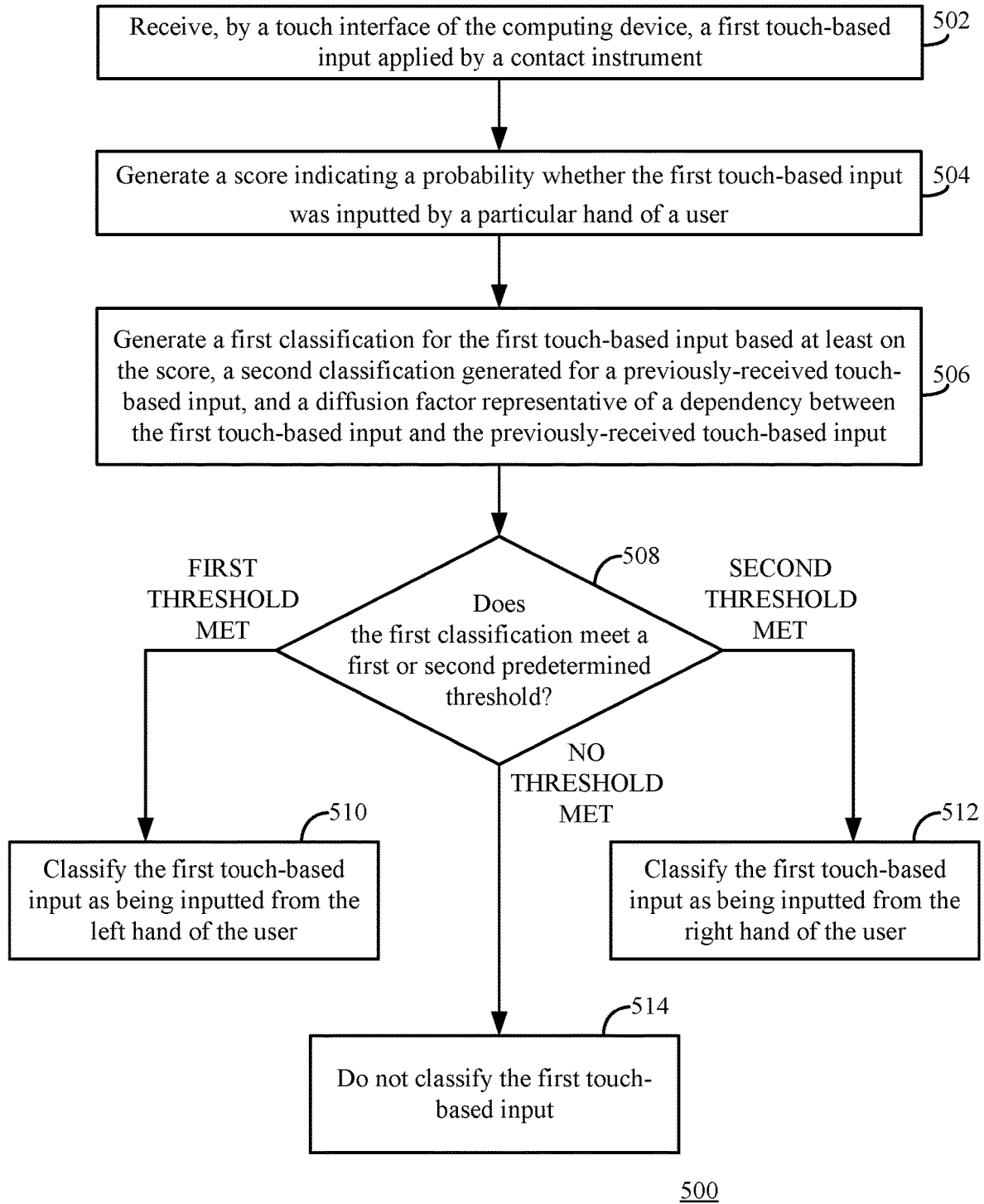
FIG. 5 shows a flowchart for determining the handedness of a user for providing touch-based input in accordance with an example embodiment.

Accordingly, the handedness of a user for providing touch-based input may be determined in many ways. For instance, FIG. 5 shows a flowchart 500 for determining the handedness of a user for providing touch-based input in accordance with an example embodiment. In an embodiment, flowchart 500 may be implemented by handedness determiner 208, as described above with reference to FIG. 2, although the method is not limited to that implementation. Accordingly, FIG. 5 will be described with continued reference to FIG. 2. Other structural and operational embodiments will be apparent to persons skilled in the relevant art(s) based on the discussion regarding flowchart 500 and handedness determiner 208 of FIG. 2.

Flowchart 500 begins at step 502. In step 502, a first touch-based input applied by a contact instrument is received by a touch interface of a computing device. For example, with reference to FIG. 2, first touch-based input that is applied by contact instrument 204 is received by touch interface 206 of computing device 202. Input detector 216 is configured 216 to receive touch-based inputs generated by interaction with contact instrument 204 via touch interface 206. Input detector 210 may be configured to determine characterization information or characteristics of the contact instrument interaction with touch interface 206. Such information is provided to score generator 218.

In step 504, a score is generated that indicates a probability whether the first touch-based input was inputted by a particular hand of a user. For example, with reference to FIG. 2, score generator 218 generates a score that indicates a probability whether the first touch-based input was inputted by a particular hand of a user. Additional details regarding generating the score are provided below with reference to FIGS. 6 and 7.

In accordance with one or more embodiments, the score is generated based at least on one feature of a plurality of features. The plurality of features comprise a first location of the touch interface at which the first touch-based input was applied by the contact instrument, a second location of the touch interface at which a touch blob was detected by the touch interface, the touch blob corresponding to a portion of the particular hand of the user that is applied to the touch interface while the first touch-based input is received, an angle at which the contact instrument is positioned with respect to the first location and the second location, a tilt angle of the contact instrument with respect to the touch interface, and an azimuth of the contact instrument. For example, with reference to FIGS. 2, 3, 4A, and 4B, score generator 218 is configured to generate the score based at least on first location 410A or 410B of touch interface 406 at which the first touch-based input was applied by contact instrument 404, second location 412A or 412B of touch interface 406 at which touch blob 408A or 408B was detected by touch interface 406, angle 420 or 422 at which contact instrument 406 is positioned with respect to first location 410A or 410B and second location 412A or 412B, a tilt angle (e.g., tilt angle 314, as shown in FIG. 3) of contact instrument 404, and an azimuth (e.g., azimuth angle 312, as shown in FIG. 3) of contact instrument 404.

In step 506, a first classification for the first touch-based input is generated based at least on the score, a second classification generated for a previously-received touch-based input, and a diffusion factor representative of a dependency between the first touch-based input and the previously-received touch-based input. For example, with reference to FIG. 2, classification generator 220 is configured to generate a first classification for the first touch-based input based at least on the score, a second classification generated for a previously-received touch-based input, and a diffusion factor representative of a dependency between the first touch-based input and the previously-received touch-based input. Additional details regarding generating the first classification is provided below with reference to FIGS. 8 and 9.

As described above, the touch-based input has a dependency with respect to the previously-received touch-based input due to their time-series nature (i.e., time-dependency) and due to inputs being generated from the same source (i.e., the same hand of a user). The diffusion factor represents the dependency of the received touch-based inputs without explicitly defining the inter-dependencies of the inputs and without assuming unrealistic assumptions, as assumed by conventional models. By bypassing the modeling of the dependencies between different instances of the touch-based input (which is not possible in conventional models), a black box prediction of the handedness matching a sequence of any length is achieved. Simply stated, a more accurate classification is generated utilizing a relatively small number of touch-based input samples as a result of the dependency approximated by the diffusion factor.

In step 508, a determination is made as to whether the first classification meets a first predetermined threshold or a second predetermined threshold. If a determination is made that the first classification meets the first predetermined threshold, flow continues to step 510. If a determination is made that the first classification meets the second predetermined threshold, flow continues to step 512. If a determination is made that neither the first predetermined threshold nor the second predetermined threshold is met, then flow continues to step 514. For example, with reference to FIG. 2, classification generator 220 is configured to determine as to whether the first classification meets a first predetermined threshold or a second predetermined threshold.

In step 510, the first touch-based input is classified as being inputted from the left hand of the user. For example, with reference to FIG. 2, classification generator 220 is configured to classify the first touch-based input as being inputted from the left hand of the user.

In step 512, the first touch-based input is classified as being inputted from the right hand of the user. For example, with reference to FIG. 2, classification generator 220 is configured to classify the first touch-based input as being inputted from the right hand of the user.

In step 514, the first touch-based input is not classified and additionally received touch-based input is processed in accordance with steps 502-514, as described above. For example, with reference to FIG. 2, classification generator 220 does not classify the first touch-based input, and flow may return to step 502, where additional touch-based input is received and the analysis described above with reference to steps 502-514 continues (e.g., until the classification meets one of the first predetermined threshold or the second predetermined threshold).

Figure 6:
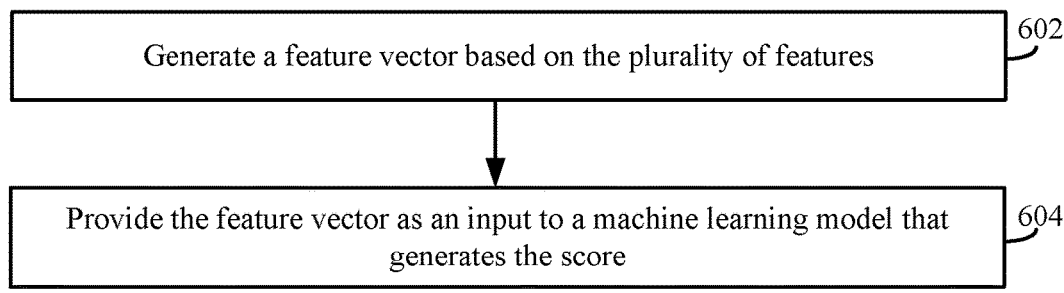
FIG. 6 shows a flowchart for generating a score indicating a probability whether touch-based input was inputted by a particular hand of a user in accordance with an example embodiment.
Figure 7:
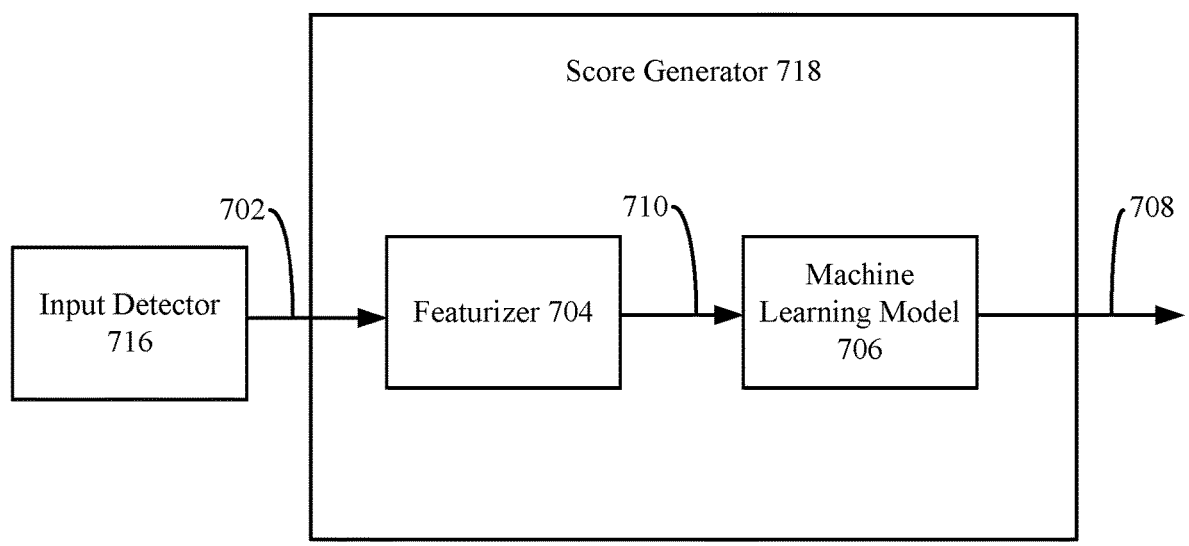
FIG. 7 shows a block diagram of a system configured to generate a score for touch-based input in accordance with an example embodiment.

FIG. 6 shows a flowchart 600 for generating a score indicating a probability whether touch-based input was inputted by a particular hand of a user in accordance with an example embodiment. In an embodiment, flowchart 600 may be implemented by a system 700, as described above with reference to FIG. 7, although the method is not limited to that implementation. Accordingly, FIG. 6 will be described with reference to FIG. 7. FIG. 7 depicts a block diagram of system 700 configured to generate a score for touch-based input in accordance with an example embodiment. As shown in FIG. 7, system 700 comprises an input detector 716 and a score generator 718, which are examples of input detector 216 and score generator 218, as respectively described above with FIG. 2. Other structural and operational embodiments will be apparent to persons skilled in the relevant art(s) based on the discussion regarding flowchart 600 and system 700 of FIG. 7.

Flowchart 600 begins at step 602. In step 602, a feature vector based on a plurality of features is generated. For example, with reference to FIG. 7, input detector 716 is configured to provide characteristics 702 determined for a contact instrument (e.g., contact instrument 204) to featurizer 704. Each of characteristics 702 may be a feature. Featurizer 704 is configured to generate a feature vector 710 based on the features. Feature vector 710 generated by featurizer 704 may take any form, such as numerical, visual, and/or textual representation, or may comprise any other suitable form. Featurizer 704 may operate in a number of ways to featurize, or generate feature vector 710 based on characteristics 702. For example, and without limitation, featurizer 704 may featurize characteristics 702 though time series analysis, keyword featurization, semantic-based featurization, etc. Featurizing the touch-based inputs based on their respective characteristics transforms the data representing the touch-based input from a high-dimensional space into a low-dimensional space such that the low-dimensional representation retains meaningful properties of the original data. As such, the amount of data that is processed and analyzed by machine learning model 706, as described below, is reduced as a result of the featurization. Accordingly, such techniques advantageously conserve computing resources (e.g., processing cycles, memory, storage, input/output (I/O) transactions, power, etc.), as a smaller amount of data is analyzed and processed.

In step 604, the feature vector is provided as an input to a machine learning model that generates the score. For example, with reference to FIG. 7, feature vector 710 is provided as an input to machine learning model 706, which generates a score 708 for the touch-based input. Score 708 indicates a probability as to whether the touch-based input was inputted by a particular hand of a user. For instance, score 708 may comprise a value between 0.0 and 1.0, where higher the number, the greater the probability that the touch-based input was inputted from a particular hand of the user. For instance, in accordance with an embodiment, the closer the value is to 1.0, the greater the probability that the touch-based input was inputted from the left hand of the user. The closer the value is to 0.0, the greater the probability that the touch-based input was inputted from the right hand of the user. In accordance with another embodiment, the closer the value is to 1.0, the greater the probability that the touch-based input was inputted from the right hand of the user. The closer the value is to 0.0, the greater the probability that the touch-based input was inputted from the left hand of the user. Score 708 is provided to classification generator 220, as described above with reference to FIG. 2.

Machine learning model 706 may comprise a supervised machine learning model, an unsupervised machine learning model, a semi-supervised machine learning model, etc. In an embodiment in which machine learning model 706 is a supervised machine learning model, machine learning model 706 may be trained utilizing a first set of training data and a second set of training data. The first set of training data may comprise feature vectors of characteristics of touch-based input that have been labelled as being provided by the left hand of one or more users, and the second set of training data may comprise feature vectors of characteristics of touch-based input that have been labelled as being provided by the right hand of user(s). Using the first and second sets of training data, machine learning model 706 learns what constitutes left-handed touch-based input and right-handed touch-based input.

Figure 8:
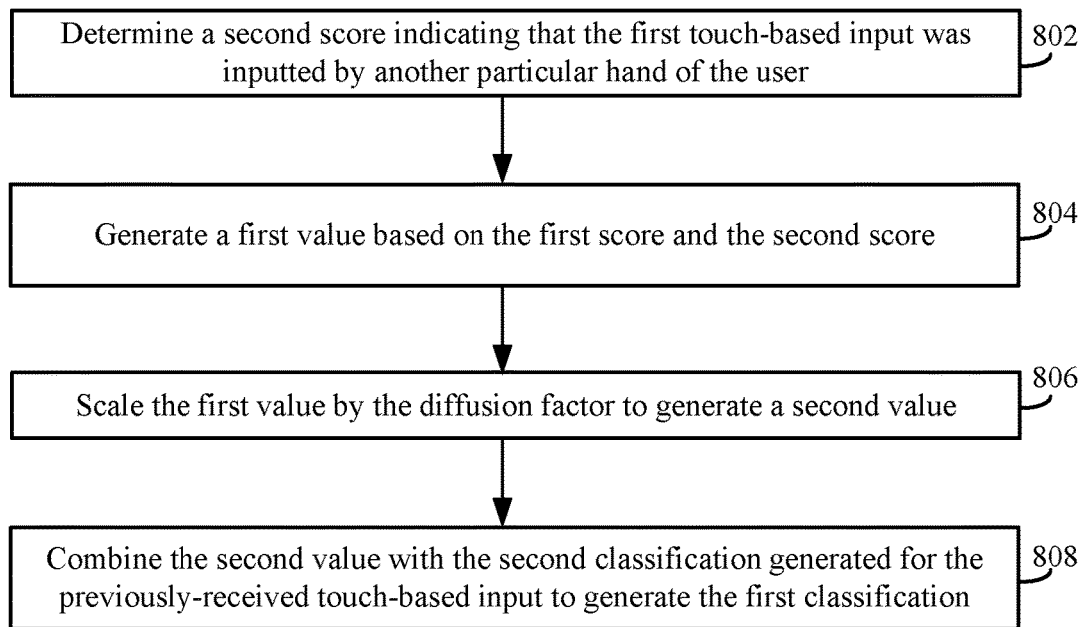
FIG. 8 shows a flowchart for generating a classification for touch-based input in accordance with an example embodiment.
Figure 9:
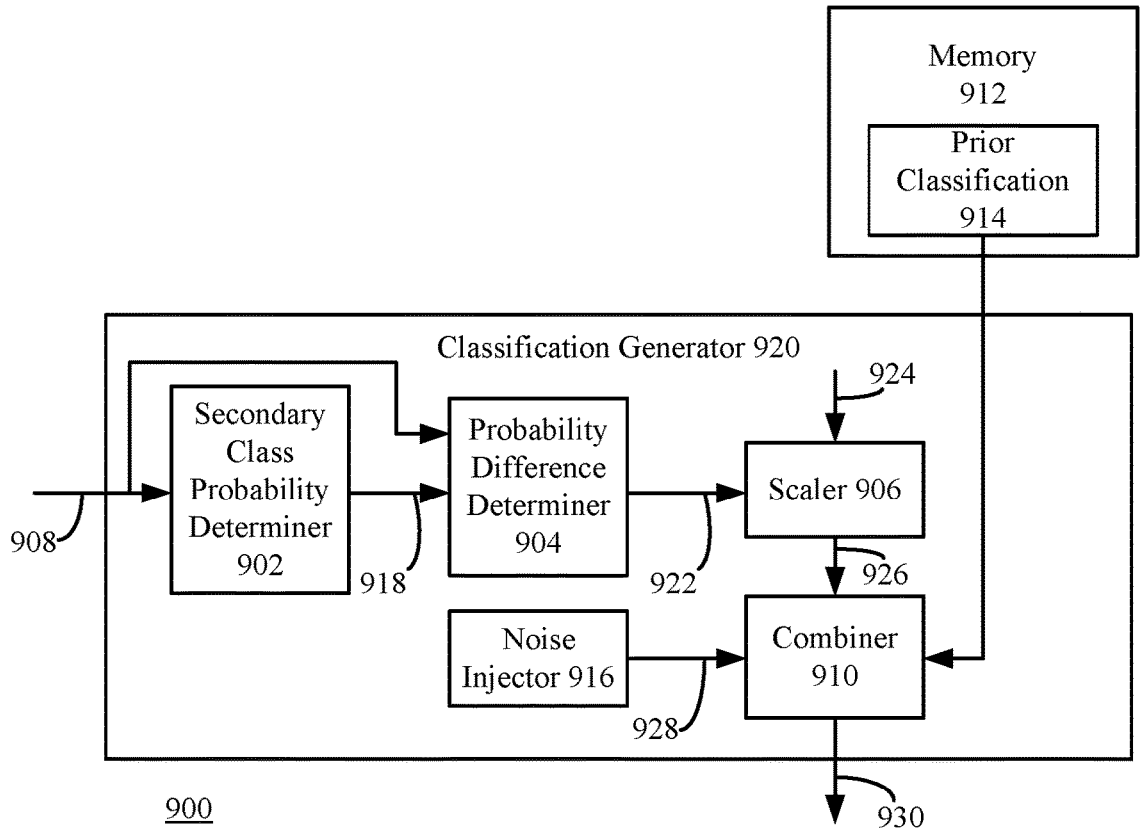
FIG. 9 shows a block diagram of a system configured to generate a classification for touch-based input in accordance with an example embodiment.

FIG. 8 shows a flowchart 800 for generating a classification for touch-based input in accordance with an example embodiment. In an embodiment, flowchart 800 may be implemented by a system 900, as described above with reference to FIG. 9, although the method is not limited to that implementation. Accordingly, FIG. 8 will be described with reference to FIG. 9. FIG. 9 shows a block diagram of system 900 configured to generate a classification for touch-based input in accordance with an example embodiment. As shown in FIG. 9, system 900 comprises a memory 912 and classification generator 920, which are examples of memory 212 and classification generator 220, as respectively described above with FIG. 2. As also shown in FIG. 9, classification generator 220 comprises a secondary class probability determiner 902, a probability difference determiner 904, a scaler 906, a noise injector 916, and a combiner 910. Classification generator 920 may be configured to generate the classification in accordance with Equation 1, as described above. Other structural and operational embodiments will be apparent to persons skilled in the relevant art(s) based on the discussion regarding flowchart 800 and system 900 of FIG. 9.

Flowchart 800 begins at step 802. In step 802, a second score indicating that the first touch-based input was inputted by another particular hand of the user is determined. For example, with reference to FIG. 9, secondary class probability determiner 902 is configured to receive score 908. Score 908 is an example of score 708, as described above with reference to FIG. 7. Accordingly, score 908 indicates a probability whether the first touch-based input was inputted by a particular hand of a user (e.g., the left hand of the user). Secondary class probability determiner 902 determines a score 918 based on score 908. For instance, secondary class probability determiner 902 may subtract score 908 from the value of 1. Score 918 indicates that the first touch-based input was inputted by another particular hand of the user (e.g., the right hand of the user). With reference to Equation 1, score 908 corresponds to $v_a$, and score 918 corresponds to $v_b$. Score 908 and score 918 are provided to probability difference determiner 904.

In step 804, a first value is generated based on the first score and the second score. For example, with reference to FIG. 9, probability difference determiner 904 is configured to determine a first value 922 based on score 908 and score 918. For instance, probability difference determiner 904 may subtract score 918 from score 908 (e.g., $v_a - v_b$, as described above with reference to Equation 1. Value 922 is provided to scaler 906.

In step 806, the first value is scaled by the diffusion factor to generate a second value. For example, with reference to FIG. 9, scaler 906 is configured to receive value 922 and a diffusion factor 924. Diffusion factor 924 is representative of a dependency between the first touch-based input and a previously-received touch-based input. With reference to Equation 1, diffusion factor 924 corresponds to d. In accordance with an embodiment, scaler 906 scales value 922 by multiplying value 922 by diffusion factor 924 to generate a second value 926. It is noted, however, that value 922 may be scaled using other techniques as would be readily apparent to those of ordinary skill in the art.

In step 808, the second value is combined with the second classification generated for the previously-received touch-based input to generate the first classification. For example, with reference to FIG. 9, combiner 910 is configured to receive value 926 and a prior classification 914. Prior classification 914 is a classification generated, by classification generator 920, for a previously-received touch-based input (e.g., the last touch-based input received). Prior classification 914 may be stored and/or retrieved from memory 912. With reference to Equation 1, prior classification 914 corresponds to $S_{t-1}$. In accordance with an embodiment, combiner 910 may combine prior classification 914 with value 926 by adding them together. It is noted, however, that value 926 and prior classification 914 may be combined using other techniques as would be readily apparent to those of ordinary skill in the art. Combiner 910 may be further configured to add noise 928 provided by noise injector 916. With reference to Equation 1, noise 928 corresponds to E. Noise 928 may be randomly-generated by noise injector 916 for each touch-based input being classified; although, the embodiments described herein are not so limited. For instance, noise injector 916 may generate noise for every other touch-based input received, every N touch-based input received, may utilize the same noise for each touch-based input received, etc. Combiner 910 generates a classification 930 based on a combination of prior classification 914, value 926 and/or noise 928. With reference to Equation 1, classification 930 corresponds $S_t$.

Each of the first and second scores represents the prediction probabilities for each class (e.g., the first score represents the probability that input was provided via the left hand, and the second score represents the probability that input was provided via the right hand). The first value generated based on these scores may represent the difference between these prediction probabilities, which is indicative of the certainness that the input was provided either via the left hand or the right hand. The first value is then scaled by the diffusion factor to generate the second value. The foregoing technique enables the inter-dependency between detected touch-based inputs to be approximated without explicitly defining the inter-dependencies of the inputs. By bypassing the modeling of the dependencies between different instances of the detected touch-based input. a more accurate classification is generated utilizing a relatively small number of touch-based input samples as a result of the dependency approximated by the diffusion factor.

As described above, each touch-based input (or frame) has a small and accumulating weight towards the final prediction (or classification) for the source (i.e., the user). Thus, if there is a sequence of similar frame predictions, then the accumulated weight should dominate the noise E and heighten the total score $S_t$ above a predetermined threshold, which in turn would grant the sequence with a constant single label. On the other hand, differing (high variance) frames would yield inconsistent predictions between consecutive inputs, thus causing the noise E to dominate the diffusion drift, and lowering the accumulated score below the thresholds of each class, effectively labeling the sequence with high uncertainty.

Figure 10:
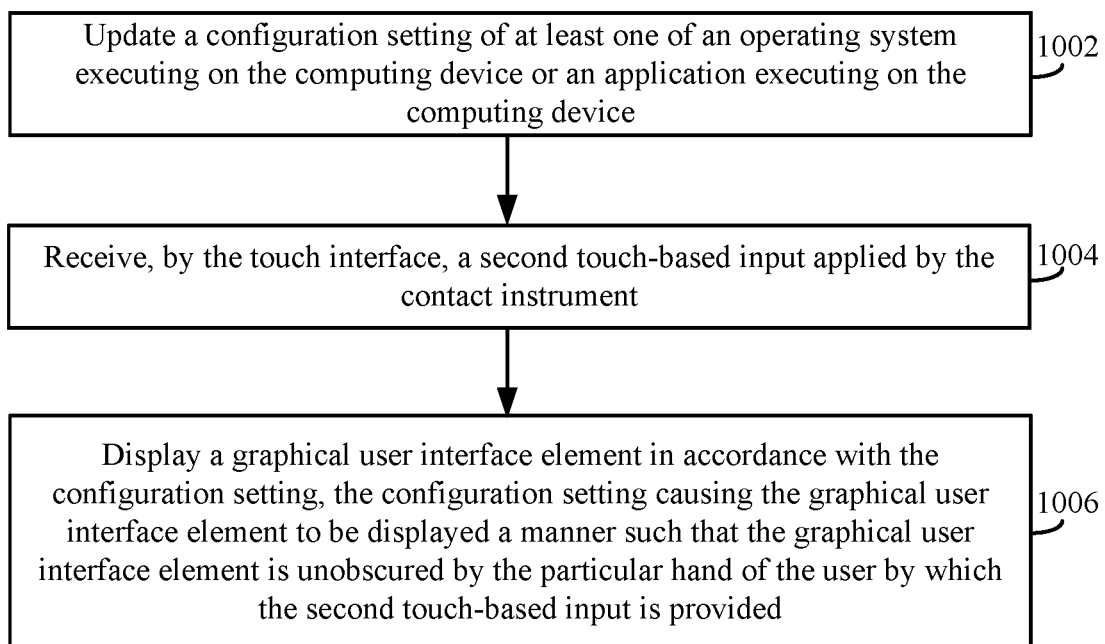
FIG. 10 shows a flowchart for updating a configuration setting based on a classification determined for touch-based input in accordance with an example embodiment.

FIG. 10 shows a flowchart 1000 for updating a configuration setting based on a classification determined for touch-based input in accordance with an example embodiment. In an embodiment, flowchart 1000 may be implemented by handedness classifier 208, as described above with reference to FIG. 2, although the method is not limited to that implementation. Accordingly, FIG. 10 will be described with reference to FIG. 2. Other structural and operational embodiments will be apparent to persons skilled in the relevant art(s) based on the discussion regarding flowchart 1000 and handedness classifier 208 of FIG. 2.

Flowchart 1000 begins at step 1002. In step 1002, a configuration setting of at least one of an operating system executing on the computing device or an application executing on the computing device is updated. For example, with reference to FIG. 2, classification generator 220 may send a command to operating system 228 and/or application(s) 226 that causes operating system 228 and/or application(s) 226 to update a configuration setting thereof. The configuration setting may specify whether the user utilizing computing device 202 provides touch-based input either with their left hand or the right hand.

In step 1004, a second touch-based input applied by the contact instrument is received. For example, with reference to FIG. 2, after classification generator 220 has classified touch-based input as either being inputted from the user's left hand or right hand, the user may provide additional touch-based input utilizing contact instruction 204 and touch interface 206.

In step 1006, responsive to receiving the second touch-based input, a graphical user interface element is displayed in accordance with the configuration setting. The configuration setting causes the graphical user interface element to be displayed a manner such that the graphical user interface element is unobscured by the particular hand of the user by which the second touch-based input is provided. For example, with reference to FIG. 2, operating system 228 and/or application(s) 226 may cause a graphical user interface element to be displayed in a manner such that the graphical user interface element is unobscured by the particular hand of the user by which the second touch-based input is provided. The foregoing is shown with reference to FIGS. 11A and 11B.

Figure 11B:
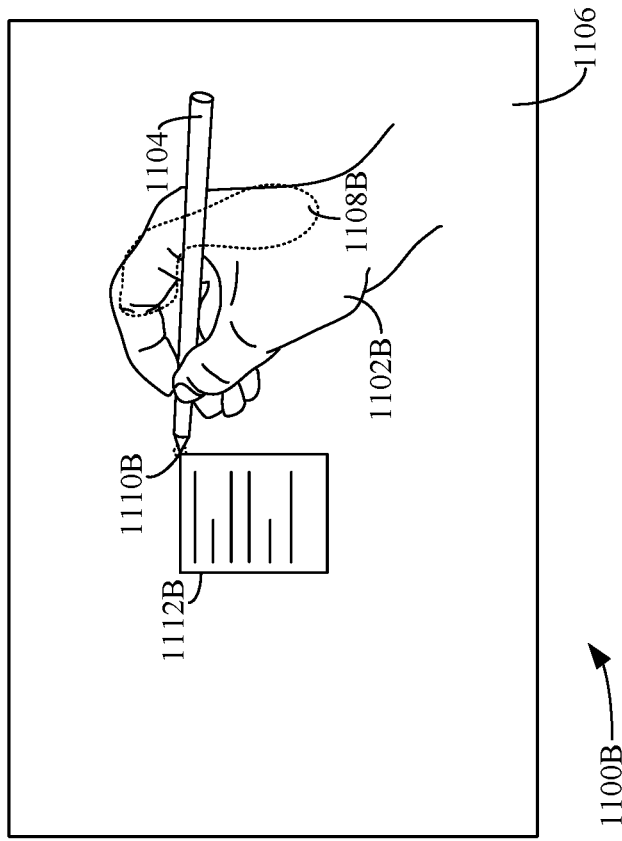
FIGS. 11A and 11B depict illustrations in which a user has provided touch-based input that causes a graphical user interface element to be displayed, in accordance with an example embodiment.
Figure 11A:
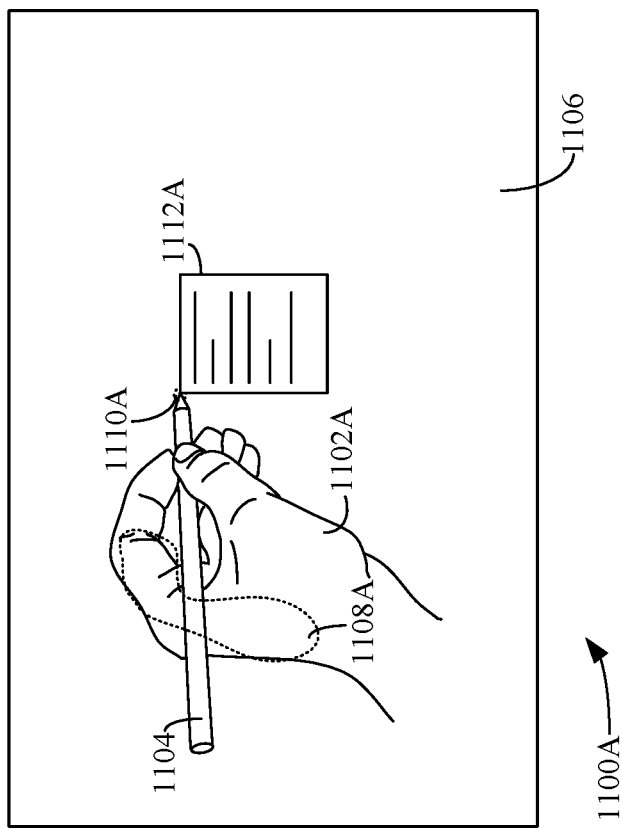

For instance, FIGS. 11A and 11B depict illustrations 1100A and 1100B in which a user has provided touch-based input that causes a graphical user interface element to be displayed in accordance with an example embodiment. In particular, FIG. 11A depicts a touch-based input provided via a user's left hand, and FIG. 11B depicts a touch-based input provided via a user's right hand. As shown in FIG. 11A, the user holds contact instrument 1104 using the user's left hand 1102A and provides a touch-based input by applying contact instrument 1104 to a touch interface 1106. As shown in FIG. 11B, the user holds contact instrument 1104 using the user's right hand 1102B. Contact instrument 1104 and touch interface 1106 are examples of contact instrument 204 and touch interface 206, as respectively described above with reference to FIG. 2.

In the example shown in FIG. 11A, the touch-based input is provided after classification generator 220 has classified touch-based input provided by the user as being from the user's left hand. The location at which contact instrument 1104 provides a touch-based input via touch interface 1106 is shown as location 1110A. As shown in FIG. 11A, responsive to receiving touch-based input at location 1110A, a graphical user interface element 1112A is displayed (e.g., by operating system 228 or an application of application(s) 226, depending on whether operating system 228 or the application is being interacted with). Graphical user interface element 1112A may comprise a menu of a plurality of user-selectable options; however, the embodiments described herein are not so limited. As further shown in FIG. 11A, graphical user interface element 1112A is displayed in a manner such that it is unobscured by the left hand, which provided the touch-based input. Specifically, graphical user interface element 1112A is displayed to the right of location 1110A. If graphical user interface element 1112A were to be displayed to the left of location 1110A, then it would be at least partially obscured by left hand 1102A.

In the example shown in FIG. 11B, the touch-based input is provided after classification generator 220 has classified touch-based input provided by the user as being from the user's right hand. The location at which contact instrument 1104 provides a touch-based input via touch interface 1106 is shown as location 1110B. As shown in FIG. 11B, responsive to receiving touch-based input at location 1110B, a graphical user interface element 1112B is displayed (e.g., by operating system 228 or an application of application(s) 226, depending on whether operating system 228 or the application is being interacted with). Graphical user interface element 1112B may comprise a menu of a plurality of user-selectable options; however, the embodiments described herein are not so limited. As further shown in FIG. 11B, graphical user interface element 1112B is displayed in a manner such that it is unobscured by the right hand, which provided the touch-based input. Specifically, graphical user interface element 1112B is displayed to the left of location 1110B. If graphical user interface element 1112B were to be displayed to the right of location 1110A, then it would be at least partially obscured by right hand 1102B.

In accordance with one or more embodiments, a third touch-based input, received by the touch interface, corresponding to a touch blob is rejected. The touch blob corresponds to a portion of the particular hand of the user that is applied to the touch interface while the second touch-based input is received. For example, with reference to FIG. 2, operating system 228 and/or application(s) 226 may reject detected touch blobs, for example while touch-based input via contact instrument 1104 is detected. This advantageously enables a user to rest his or her hand naturally on touch interface 1106 while providing touch-based input via contact instrument 1104 without having to worry about providing unintended touch-based input, which may cause unwanted marks and/or unintended functionality.

For example, with reference to FIG. 11A, when applying the touch-based input via contact instrument 1106, the user rests his or her left hand on touch interface 1106, thereby causing a portion of the user's left hand to come into contact with touch interface 1106. The portion of the user's left hand is shown as touch blob 1108A. With reference to FIG. 11B, when applying the touch-based input via contact instrument 1106, the user rests his or her right hand on touch interface 1106, thereby causing a portion of the user's right hand to come into contact with touch interface 1106. The portion of the user's right hand is shown as touch blob 1108B. After handedness classifier 208 classifies touch-based input as being inputted from either a user's left hand or right hand, operating system 228 and/or application(s) 226 may respectively reject touch blobs 1108A and 1108B (i.e., not act on) while touch-based input via contact instrument 1104 is detected.

In accordance with one or more embodiments, the second touch-based input is received in accordance with at least one of a time period that exceeds a third predetermined threshold or at a pressure that exceeds a fourth predetermined threshold. For example, with reference to FIGS. 11A and 11B, the second touch-based input may be a "hard press", in which contact instrument 1104 is placed at location 1110A or 1110B for a time period that exceeds a third predetermined threshold (e.g., 2 seconds) and/or at a pressure that exceeds a fourth predetermined threshold. Touch interface 1106 may comprise an array of piezoelectric sensors that record pressure (e.g., pixel-by-pixel) at their locations. The recorded pressure may be provided to and/or detected by operating system 228 and/or application(s) 226. The time period may be monitored by input detector 216 and provided to operating system 228 and/or application(s) 226. Alternatively, operating system 228 and/or application(s) 226 may monitor the time period. Operating system 228 and/or application(s) 226 may cause graphical user interface element 1112A or 1112B to be displayed responsive to the recorded pressure and/or the period of time that contact instrument 1104 is applied at location 1110A or 1100B meeting their respective thresholds.

Utilizing time-based and/or pressure-based threshold, as described above, advantageously enables contact instrument 1104 to provide different types of input. For instance, not only can contact instrument 1104 provide input by applying the tip thereof to touch interface 1106, contact instrument 1104 may perform and/or activate other functionality based on the length of time that the tip touches touch interface 1106 and/or based on the amount of pressure applied to touch interface 1106.

III. Example Mobile Device and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including system 100 of FIG. 1, system 200 of FIG. 2, system 700 of FIG. 7, and system 900 of FIG. 9, along with any components and/or subcomponents thereof, as well as the flowcharts/flow diagrams described herein, including portions thereof, and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 12:
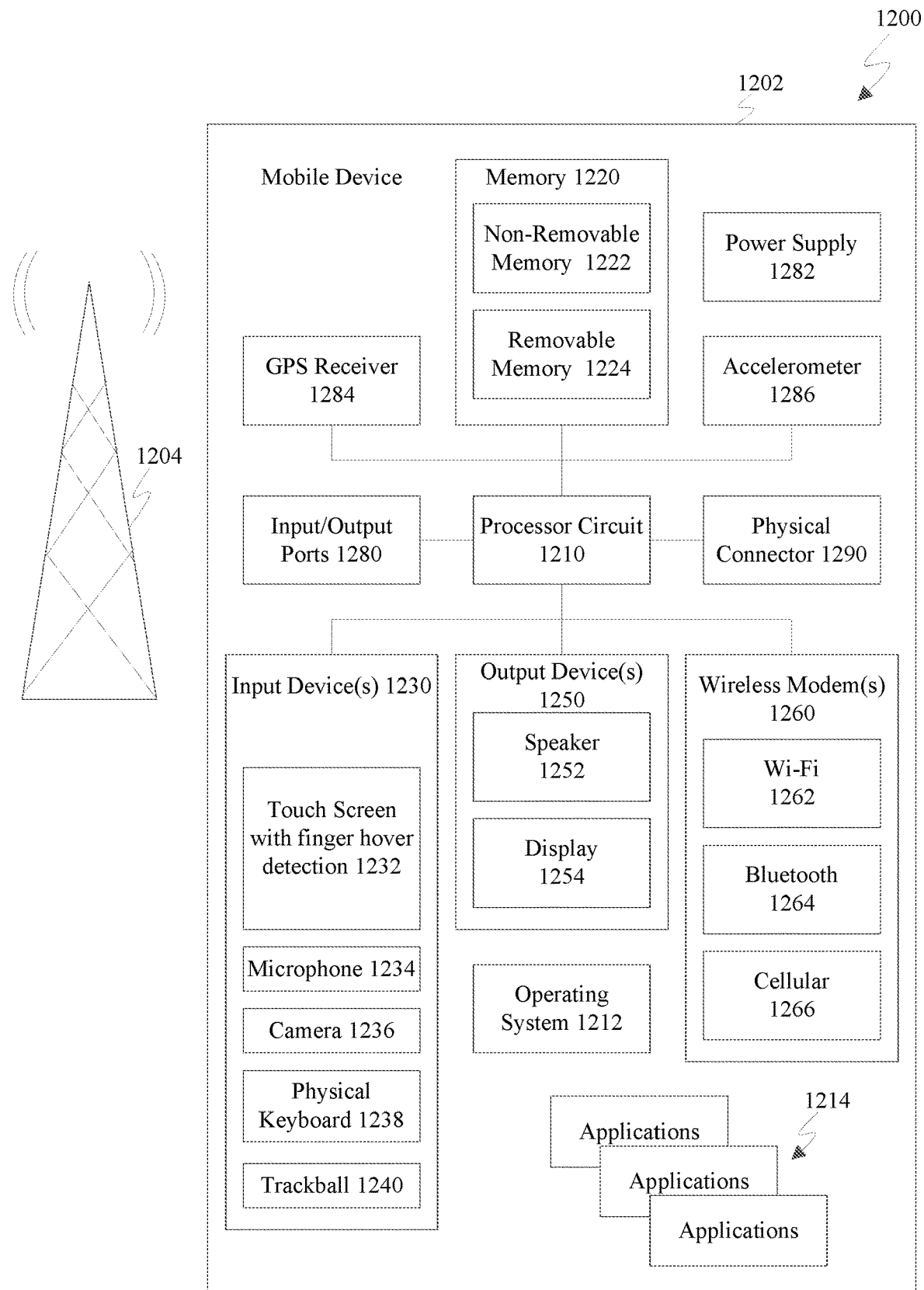
FIGS. 12 and 13 show block diagrams of example computing devices that may be used to implement embodiments.

FIG. 12 is a block diagram of an exemplary mobile system 1200 that includes a mobile device 1202 that may implement embodiments described herein. For example, mobile device 1202 may be used to implement any system, client, or device, or components/subcomponents thereof, in the preceding sections. As shown in FIG. 12, mobile device 1202 includes a variety of optional hardware and software components. Any component in mobile device 1202 can communicate with any other component, although not all connections are shown for ease of illustration. Mobile device 1202 can be any of a variety of computing devices (e.g., cell phone, smart phone, handheld computer, Personal Digital Assistant (PDA), etc.) and can allow wireless two-way communications with one or more mobile communications networks 1204, such as a cellular or satellite network, or with a local area or wide area network.

Mobile device 1202 can include a controller or processor 1210 (e.g., signal processor, microprocessor, ASIC, or other control and processing logic circuitry) for performing such tasks as signal coding, data processing, input/output processing, power control, and/or other functions. An operating system 1212 can control the allocation and usage of the components of mobile device 1202 and provide support for one or more application programs 1214 (also referred to as "applications" or "apps"). Application programs 1214 may include common mobile computing applications (e.g., e-mail applications, calendars, contact managers, web browsers, messaging applications) and any other computing applications (e.g., word processing applications, mapping applications, media player applications).

Mobile device 1202 can include memory 1220. Memory 1220 can include non-removable memory 1222 and/or removable memory 1224. Non-removable memory 1222 can include RAM, ROM, flash memory, a hard disk, or other well-known memory devices or technologies. Removable memory 1224 can include flash memory or a Subscriber Identity Module (SIM) card, which is well known in GSM communication systems, or other well-known memory devices or technologies, such as "smart cards." Memory 1220 can be used for storing data and/or code for running operating system 1212 and application programs 1214. Example data can include web pages, text, images, sound files, video data, or other data to be sent to and/or received from one or more network servers or other devices via one or more wired or wireless networks. Memory 1220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1220. These programs include operating system 1212, one or more application programs 1214, and other program modules and program data. Examples of such application programs or program modules may include, for example, computer program logic (e.g., computer program code or instructions) for implementing one or more of system 100 of FIG. 1, system 200 of FIG. 2, system 700 of FIG. 7, and system 900 of FIG. 9, along with any components and/or subcomponents thereof, as well as the flowcharts/flow diagrams described herein, including portions thereof, and/or further examples described herein.

Mobile device 1202 can support one or more input devices 1230, such as a touch screen 1232, a microphone 1234, a camera 1236, a physical keyboard 1238 and/or a trackball 1240 and one or more output devices 1250, such as a speaker 1252 and a display 1254. Other possible output devices (not shown) can include piezoelectric or other haptic output devices. Some devices can serve more than one input/output function. For example, touch screen 1232 and display 1254 can be combined in a single input/output device. Input devices 1230 can include a Natural User Interface (NUI).

One or more wireless modems 1260 can be coupled to antenna(s) (not shown) and can support two-way communications between processor 1210 and external devices, as is well understood in the art. Modem 1260 is shown generically and can include a cellular modem 1266 for communicating with the mobile communication network 1204 and/or other radio-based modems (e.g., Bluetooth 1264 and/or Wi-Fi 1262). At least one wireless modem 1260 is typically configured for communication with one or more cellular networks, such as a GSM network for data and voice communications within a single cellular network, between cellular networks, or between the mobile device and a public switched telephone network (PSTN).

Mobile device 1202 can further include at least one input/output port 1280, a power supply 1282, a satellite navigation system receiver 1284, such as a Global Positioning System (GPS) receiver, an accelerometer 1286, and/or a physical connector 1290, which can be a USB port, IEEE 1394 (FireWire) port, and/or RS-232 port. The illustrated components of mobile device 1202 are not required or all-inclusive, as any components can be deleted and other components can be added as would be recognized by one skilled in the art.

In an embodiment, mobile device 1202 is configured to implement any of the above-described features of flowcharts herein. Computer program logic for performing any of the operations, steps, and/or functions described herein may be stored in memory 1220 and executed by processor 1210.

Figure 13:
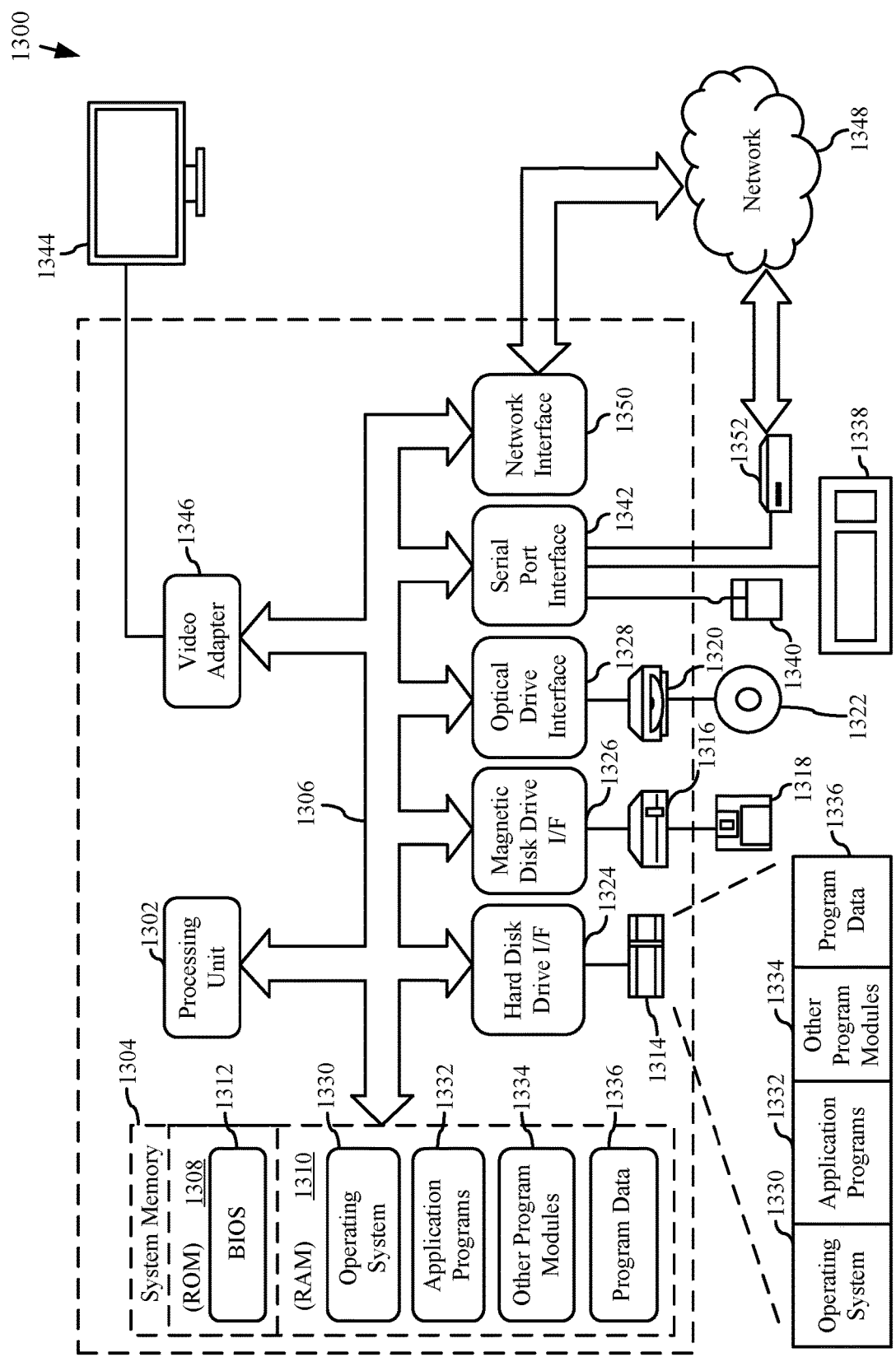

FIG. 13 depicts an exemplary implementation of a computing device 1300 in which embodiments may be implemented. For example, embodiments described herein may be implemented in one or more computing devices similar to computing device 1300 in stationary or mobile computer embodiments, including one or more features of computing device 1300 and/or alternative features. The description of computing device 1300 provided herein is provided for purposes of illustration, and is not intended to be limiting. Embodiments may be implemented in further types of computer systems and/or game consoles, etc., as would be known to persons skilled in the relevant art(s).

As shown in FIG. 13, computing device 1300 includes one or more processors, referred to as processor circuit 1302, a system memory 1304, and a bus 1306 that couples various system components including system memory 1304 to processor circuit 1302. Processor circuit 1302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1302 may execute program code stored in a computer readable medium, such as program code of operating system 1330, application programs 1332, other programs 1334, etc. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random access memory (RAM) 1310. A basic input/output system 1312 (BIOS) is stored in ROM 1308.

Computing device 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1330, one or more application programs 1332, other programs 1334, and program data 1336. Application programs 1332 or other programs 1334 may include, for example, computer program logic (e.g., computer program code or instructions) for implementing embodiments described herein, such as system 100 of FIG. 1, system 200 of FIG. 2, system 700 of FIG. 7, and system 900 of FIG. 9, along with any components and/or subcomponents thereof, as well as the flowcharts/flow diagrams described herein, including portions thereof, and/or further examples described herein.

A user may enter commands and information into the computing device 1300 through input devices such as keyboard 1338 and pointing device 1340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1302 through a serial port interface 1342 that is coupled to bus 1306, but may be connected by other interfaces, such as a parallel port, game port, or a universal serial bus (USB).

A display screen 1344 is also connected to bus 1306 via an interface, such as a video adapter 1346. Display screen 1344 may be external to, or incorporated in computing device 1300. Display screen 1344 may display information, as well as being a user interface for receiving user commands and/or other information (e.g., by touch, finger gestures, virtual keyboard, etc.). In addition to display screen 1344, computing device 1300 may include other peripheral output devices (not shown) such as speakers and printers.

Computing device 1300 is connected to a network 1348 (e.g., the Internet) through an adaptor or network interface 1350, a modem 1352, or other means for establishing communications over the network. Modem 1352, which may be internal or external, may be connected to bus 1306 via serial port interface 1342, as shown in FIG. 13, or may be connected to bus 1306 using another interface type, including a parallel interface.

As used herein, the terms "computer program medium," "computer-readable medium," and "computer-readable storage medium," etc., are used to refer to physical hardware media. Examples of such physical hardware media include the hard disk associated with hard disk drive 1314, removable magnetic disk 1318, removable optical disk 1322, other physical hardware media such as RAMs, ROMs, flash memory cards, digital video disks, zip disks, MEMs, nanotechnology-based storage devices, and further types of physical/tangible hardware storage media (including memory 1320 of FIG. 13). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1332 and other programs 1334) may be stored on the hard disk, magnetic disk, optical disk, ROM, RAM, or other hardware storage medium. Such computer programs may also be received via network interface 1350, serial port interface 1342, or any other interface type. Such computer programs, when executed or loaded by an application, enable computing device 1300 to implement features of embodiments discussed herein. Accordingly, such computer programs represent controllers of the computing device 1300.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Further Example Embodiments

A computing device comprising at least one processor circuit, a physical data storage, and at least one memory that stores program configured to be executed by the at least one processor circuit. The program code comprises a handedness classifier configured to: receive, by a touch interface of the computing device, a first touch-based input applied by a contact instrument; generate a score indicating a probability whether the first touch-based input was inputted by a particular hand of a user; generate a first classification for the first touch-based input based at least on the score, a second classification generated for a previously-received touch-based input, and a diffusion factor representative of a dependency between the first touch-based input and the previously-received touch-based input; determine whether the first classification meets a first predetermined threshold or a second predetermined threshold; in response to a determination that the first classification meets the first predetermined threshold, classify the first touch-based input as being inputted from the left hand of the user; and in response to determination that the first classification meets the second predetermined threshold, classify the first touch-based input as being inputted from the right hand of the user.

In an embodiment of the foregoing computing device, the handedness classifier is further configured to: update a configuration setting of at least one of an operating system executing on the computing device or an application executing on the computing device; and receive, by the touch interface, a second touch-based input applied by the contact instrument, the second touch-based input causing a graphical user interface element to be displayed in accordance with the configuration setting, the configuration setting causing the graphical user interface element to be displayed a manner such that the graphical user interface element is unobscured by the particular hand of the user by which the second touch-based input is provided.

In an embodiment of the foregoing computing device, the handedness classifier is further configured to: reject a third touch-based input, received by the touch interface, corresponding to a touch blob, the touch blob corresponding to a portion of the particular hand of the user that is applied to the touch interface while the second touch-based input is received.

In an embodiment of the foregoing computing device, the second touch-based input is received in accordance with at least one of: a time period that exceeds a third predetermined threshold; or at a pressure that exceeds a fourth predetermined threshold.

In an embodiment of the foregoing computing device, the score is generated based at least on one feature of a plurality of features, the plurality of features comprising: a first location of the touch interface at which the first touch-based input was applied by the contact instrument; a second location of the touch interface at which a touch blob was detected by the touch interface, the touch blob corresponding to a portion of the particular hand of the user that is applied to the touch interface while the first touch-based input is received; an angle at which the contact instrument is positioned with respect to the first location and the second location; a tilt angle of the contact instrument with respect to the touch interface; and an azimuth of the contact instrument. A combination of one or more of these characteristics provide some type of indication as to which hand has provided input via contact instrument 204. For instance, with reference to FIG. 2, left-handed users tend to hold contact instrument 204 such that it has a first tilt angle and azimuth (e.g., contact instrument 204 points downwards towards touch interface 206 and to the right (i.e., away) from the left hand), and right-handed users tend to hold contact instrument 204 such that it has a second tilt angle and azimuth (e.g., contact instrument 204 points downwards towards touch interface 206 and to the left (i.e., away) from the right hand). The location of touch interface 206 at which touch-based input is applied by contact instrument 204, and the location at which the touch blob is detected by touch interface 206 may also be indicative as to which hand provided input via contact instrument 204. For instance, as described above with reference to FIGS. 4A and 4B, utilizing these locations, an angle at which contact instrument 204 is positioned with respect to these locations is determined. The determined angle is indicative of the hand utilized to provide touch-based input via contact instrument 204.

In an embodiment of the foregoing computing device, the handedness classifier is further configured to: generate a feature vector based on the plurality of features; and provide the feature vector as an input to a machine learning model that generates the score.

In an embodiment of the foregoing computing device, the handedness classifier is further configured to: determine a second score indicating that the first touch-based input was inputted by another particular hand of the user; generate a first value based on the first score and the second score; scale the first value by the diffusion factor to generate a second value; and combine the second value with the second classification generated for the previously-received touch-based input to generate the first classification. Each of the first and second scores represents the prediction probabilities for each class (e.g., the first score represents the probability that input was provided via the left hand, and the second score represents the probability that input was provided via the right hand). The first value generated based on these scores may represent the difference between these prediction probabilities, which is indicative of the certainness that the input was provided either via the left hand or the right hand. The first value is then scaled by the diffusion factor to generate the second value. The foregoing technique enables the inter-dependency between detected touch-based inputs to be approximated without explicitly defining the inter-dependencies of the inputs. By bypassing the modeling of the dependencies between different instances of the detected touch-based input. a more accurate classification is generated utilizing a relatively small number of touch-based input samples as a result of the dependency approximated by the diffusion factor.

A method implemented on a computing device is also described herein. The method includes: receiving, by a touch interface of the computing device, a first touch-based input applied by a contact instrument; generating a score indicating a probability whether the first touch-based input was inputted by a particular hand of a user; generating a first classification for the first touch-based input based at least on the score, a second classification generated for a previously-received touch-based input, and a diffusion factor representative of a dependency between the first touch-based input and the previously-received touch-based input; determining whether the first classification meets a first predetermined threshold or a second predetermined threshold; in response to determining that the first classification meets the first predetermined threshold, classifying the first touch-based input as being inputted from the left hand of the user; and in response to determining that the first classification meets the second predetermined threshold, classifying the first touch-based input as being inputted from the right hand of the user.

In an embodiment of the foregoing method, the method further comprises: updating a configuration setting of at least one of an operating system executing on the computing device or an application executing on the computing device; receiving, by the touch interface, a second touch-based input applied by the contact instrument; and responsive to receiving the second touch-based input, displaying a graphical user interface element in accordance with the configuration setting, the configuration setting causing the graphical user interface element to be displayed a manner such that the graphical user interface element is unobscured by the particular hand of the user by which the second touch-based input is provided.

In an embodiment of the foregoing method, the method further comprises: rejecting a third touch-based input, received by the touch interface, corresponding to a touch blob, the touch blob corresponding to a portion of the particular hand of the user that is applied to the touch interface while the second touch-based input is received.

In an embodiment of the foregoing method, the second touch-based input is received in accordance with at least one of: a time period that exceeds a third predetermined threshold; or at a pressure that exceeds a fourth predetermined threshold.

In an embodiment of the foregoing method, the score is generated based at least on one feature of a plurality of features, the plurality of features comprising: a first location of the touch interface at which the first touch-based input was applied by the contact instrument; a second location of the touch interface at which a touch blob was detected by the touch interface, the touch blob corresponding to a portion of the particular hand of the user that is applied to the touch interface while the first touch-based input is received; an angle at which the contact instrument is positioned with respect to the first location and the second location; a tilt angle of the contact instrument with respect to the touch interface; and an azimuth of the contact instrument.

In an embodiment of the foregoing method, said generating the score comprises: generating a feature vector based on the plurality of features; and providing the feature vector as an input to a machine learning model that generates the score.

In an embodiment of the foregoing method, said generating the first classification comprises: determining a second score indicating that the first touch-based input was inputted by another particular hand of the user; generating a first value based on the first score and the second score; scaling the first value by the diffusion factor to generate a second value; and combining the second value with the second classification generated for the previously-received touch-based input to generate the first classification.

A computer-readable storage medium having program instructions recorded thereon that, when executed by a processing device of a computing device, perform a method, is also described. The method includes:

In an embodiment of the foregoing computer-readable storage medium, receiving, by a touch interface of the computing device, a first touch-based input applied by a contact instrument; generating a score indicating a probability whether the first touch-based input was inputted by a particular hand of a user; generating a first classification for the first touch-based input based at least on the score, a second classification generated for a previously-received touch-based input, and a diffusion factor representative of a dependency between the first touch-based input and the previously-received touch-based input; determining whether the first classification meets a first predetermined threshold or a second predetermined threshold; in response to determining that the first classification meets the first predetermined threshold, classifying the first touch-based input as being inputted from the left hand of the user; and in response to determining that the first classification meets the second predetermined threshold, classifying the first touch-based input as being inputted from the right hand of the user.

In an embodiment of the foregoing computer-readable storage medium, the method further comprises: updating a configuration setting of at least one of an operating system executing on the computing device or an application executing on the computing device; receiving, by the touch interface, a second touch-based input applied by the contact instrument; and responsive to receiving the second touch-based input, displaying a graphical user interface element in accordance with the configuration setting, the configuration setting causing the graphical user interface element to be displayed a manner such that the graphical user interface element is unobscured by the particular hand of the user by which the second touch-based input is provided.

In an embodiment of the foregoing computer-readable storage medium, the method further comprises: rejecting a third touch-based input, received by the touch interface, corresponding to a touch blob, the touch blob corresponding to a portion of the particular hand of the user that is applied to the touch interface while the second touch-based input is received.

In an embodiment of the foregoing computer-readable storage medium, the second touch-based input is received in accordance with at least one of: a time period that exceeds a third predetermined threshold; or at a pressure that exceeds a fourth predetermined threshold.

In an embodiment of the foregoing computer-readable storage medium, the score is generated based at least on one feature of a plurality of features, the plurality of features comprising: a first location of the touch interface at which the first touch-based input was applied by the contact instrument; a second location of the touch interface at which a touch blob was detected by the touch interface, the touch blob corresponding to a portion of the particular hand of the user that is applied to the touch interface while the first touch-based input is received; an angle at which the contact instrument is positioned with respect to the first location and the second location; a tilt angle of the contact instrument with respect to the touch interface; and an azimuth of the contact instrument.

In an embodiment of the foregoing computer-readable storage medium, said generating the score comprises: generating a feature vector based on the plurality of features; and providing the feature vector as an input to a machine learning model that generates the score.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A computing device, comprising:
   at least one processor circuit; and
   at least one memory that stores program code configured to be executed by the at least one processor circuit, the program code comprising:
      a handedness classifier configured to:
         receive, by a touch interface of the computing device, a first touch-based input applied by a contact instrument;
         generate a score indicating a probability whether the first touch-based input was inputted by a particular hand of a user;
         generate a first classification for the first touch-based input based at least on the score, a second classification generated for a previously-received touch-based input, and a diffusion factor representative of a dependency between the first touch-based input and the previously-received touch-based input;
         determine whether the first classification meets a first predetermined threshold or a second predetermined threshold;
            in response to a determination that the first classification meets the first predetermined threshold, classify the first touch-based input as being inputted from the left hand of the user; and
            in response to determination that the first classification meets the second predetermined threshold, classify the first touch-based input as being inputted from the right hand of the user.

2. The computing device of claim 1, wherein the handedness classifier is further configured to:
   update a configuration setting of at least one of an operating system executing on the computing device or an application executing on the computing device; and
   receive, by the touch interface, a second touch-based input applied by the contact instrument, the second touch-based input causing a graphical user interface element to be displayed in accordance with the configuration setting, the configuration setting causing the graphical user interface element to be displayed a manner such that the graphical user interface element is unobscured by the particular hand of the user by which the second touch-based input is provided.

3. The computing device of claim 2, wherein the handedness classifier is further configured to:
   reject a third touch-based input, received by the touch interface, corresponding to a touch blob, the touch blob corresponding to a portion of the particular hand of the user that is applied to the touch interface while the second touch-based input is received.

4. The computing device of claim 2, the second touch-based input is received in accordance with at least one of:
   a time period that exceeds a third predetermined threshold; or
   at a pressure that exceeds a fourth predetermined threshold.

5. The computing device of claim 1, wherein the score is generated based at least on one feature of a plurality of features, the plurality of features comprising:
   a first location of the touch interface at which the first touch-based input was applied by the contact instrument;
   a second location of the touch interface at which a touch blob was detected by the touch interface, the touch blob corresponding to a portion of the particular hand of the user that is applied to the touch interface while the first touch-based input is received;
   an angle at which the contact instrument is positioned with respect to the first location and the second location;
   a tilt angle of the contact instrument with respect to the touch interface; and
   an azimuth of the contact instrument.

6. The computing device of claim 5, wherein the handedness classifier is further configured to:
   generate a feature vector based on the plurality of features; and
   provide the feature vector as an input to a machine learning model that generates the score.

7. The computing device of claim 1, wherein the handedness classifier is further configured to:

determine a second score indicating that the first touch-based input was inputted by another particular hand of the user;
generate a first value based on the first score and the second score;
scale the first value by the diffusion factor to generate a second value; and
combine the second value with the second classification generated for the previously-received touch-based input to generate the first classification.

8. A method implemented on a computing device, comprising:
receiving, by a touch interface of the computing device, a first touch-based input applied by a contact instrument;
generating a score indicating a probability whether the first touch-based input was inputted by a particular hand of a user;
generating a first classification for the first touch-based input based at least on the score, a second classification generated for a previously-received touch-based input, and a diffusion factor representative of a dependency between the first touch-based input and the previously-received touch-based input;
determining whether the first classification meets a first predetermined threshold or a second predetermined threshold;
in response to determining that the first classification meets the first predetermined threshold, classifying the first touch-based input as being inputted from the left hand of the user; and
in response to determining that the first classification meets the second predetermined threshold, classifying the first touch-based input as being inputted from the right hand of the user.

9. The method of claim 8, further comprising:
updating a configuration setting of at least one of an operating system executing on the computing device or an application executing on the computing device;
receiving, by the touch interface, a second touch-based input applied by the contact instrument; and
responsive to receiving the second touch-based input, displaying a graphical user interface element in accordance with the configuration setting, the configuration setting causing the graphical user interface element to be displayed a manner such that the graphical user interface element is unobscured by the particular hand of the user by which the second touch-based input is provided.

10. The method of claim 9, further comprising:
rejecting a third touch-based input, received by the touch interface, corresponding to a touch blob, the touch blob corresponding to a portion of the particular hand of the user that is applied to the touch interface while the second touch-based input is received.

11. The method of claim 9, wherein the second touch-based input is received in accordance with at least one of:
a time period that exceeds a third predetermined threshold; or
at a pressure that exceeds a fourth predetermined threshold.

12. The method of claim 8, wherein the score is generated based at least on one feature of a plurality of features, the plurality of features comprising:
a first location of the touch interface at which the first touch-based input was applied by the contact instrument;
a second location of the touch interface at which a touch blob was detected by the touch interface, the touch blob corresponding to a portion of the particular hand of the user that is applied to the touch interface while the first touch-based input is received;
an angle at which the contact instrument is positioned with respect to the first location and the second location;
a tilt angle of the contact instrument with respect to the touch interface; and
an azimuth of the contact instrument.

13. The method of claim 12, wherein said generating the score comprises:
generating a feature vector based on the plurality of features; and
providing the feature vector as an input to a machine learning model that generates the score.

14. The method of claim 8, wherein said generating the first classification comprises:
determining a second score indicating that the first touch-based input was inputted by another particular hand of the user;
generating a first value based on the first score and the second score;
scaling the first value by the diffusion factor to generate a second value; and
combining the second value with the second classification generated for the previously-received touch-based input to generate the first classification.

15. A computer-readable storage medium having program instructions recorded thereon that, when executed by at least one processor of a computing device, perform a method, the method comprising:
receiving, by a touch interface of the computing device, a first touch-based input applied by a contact instrument;
generating a score indicating a probability whether the first touch-based input was inputted by a particular hand of a user;
generating a first classification for the first touch-based input based at least on the score, a second classification generated for a previously-received touch-based input, and a diffusion factor representative of a dependency between the first touch-based input and the previously-received touch-based input;
determining whether the first classification meets a first predetermined threshold or a second predetermined threshold;
in response to determining that the first classification meets the first predetermined threshold, classifying the first touch-based input as being inputted from the left hand of the user; and
in response to determining that the first classification meets the second predetermined threshold, classifying the first touch-based input as being inputted from the right hand of the user.

16. The computer-readable storage medium of claim 15, the method further comprising:
updating a configuration setting of at least one of an operating system executing on the computing device or an application executing on the computing device;
receiving, by the touch interface, a second touch-based input applied by the contact instrument; and
responsive to receiving the second touch-based input, displaying a graphical user interface element in accordance with the configuration setting, the configuration setting causing the graphical user interface element to be displayed a manner such that the graphical user interface element is unobscured by the particular hand of the user by which the second touch-based input is provided.

17. The computer-readable storage medium of claim 16, the method further comprising:

rejecting a third touch-based input, received by the touch interface, corresponding to a touch blob, the touch blob corresponding to a portion of the particular hand of the user that is applied to the touch interface while the second touch-based input is received.

18. The computer-readable storage medium of claim 16, wherein the second touch-based input is received in accordance with at least one of:

a time period that exceeds a third predetermined threshold; or at a pressure that exceeds a fourth predetermined threshold.

19. The computer-readable storage medium of claim 15, wherein the score is generated based at least on one feature of a plurality of features, the plurality of features comprising:

a first location of the touch interface at which the first touch-based input was applied by the contact instrument;

a second location of the touch interface at which a touch blob was detected by the touch interface, the touch blob corresponding to a portion of the particular hand of the user that is applied to the touch interface while the first touch-based input is received;

an angle at which the contact instrument is positioned with respect to the first location and the second location;

a tilt angle of the contact instrument with respect to the touch interface; and an azimuth of the contact instrument.

20. The computer-readable storage medium of claim 19, wherein said generating the score comprises:

generating a feature vector based on the plurality of features; and providing the feature vector as an input to a machine learning model that generates the score.

* * * * *